United States Patent
Tajima et al.

[11] Patent Number: 5,859,521
[45] Date of Patent: Jan. 12, 1999

[54] VARIABLE SPEED CONTROLLER FOR AN AC MOTOR

[75] Inventors: Hirokazu Tajima; Hidetoshi Umida, both of Tokyo; Hiroshi Tetsutani, Hyogo, all of Japan

[73] Assignee: Fuji Electric Co., Ltd., Tokyo, Japan

[21] Appl. No.: 871,068

[22] Filed: Jun. 9, 1997

[30] Foreign Application Priority Data

Jun. 10, 1996 [JP] Japan .................................. 8-146846

[51] Int. Cl.⁶ .............................. H02P 21/00; H02P 5/40
[52] U.S. Cl. ........................... 318/809; 318/804; 318/805
[58] Field of Search .................... 318/798–801, 318/804, 805, 809–812, 807, 808

[56] References Cited

U.S. PATENT DOCUMENTS 5,532,570  7/1996  Tajima et al. ............................ 318/809
5,734,251  3/1998  Tajima et al. ............................ 318/809

*Primary Examiner*—Bentsu Ro
*Attorney, Agent, or Firm*—Baker & Botts, L.L.P.

[57] ABSTRACT

To provide a trans-vector controller for an alternating current ("AC") motor that facilitates operating the secondary resistance of the AC motor without experimentally rotating the AC motor.

In a preferred embodiment, the variable speed control circuit, including a secondary resistance value generating device, changes the direct current ("DC") exciting current and operates the secondary resistance of an induction motor by superimposing an AC signal with small amplitude outputted from a AC signal generator onto a reference current value immediately before the start of the induction motor in the state of DC excitation.

11 Claims, 24 Drawing Sheets

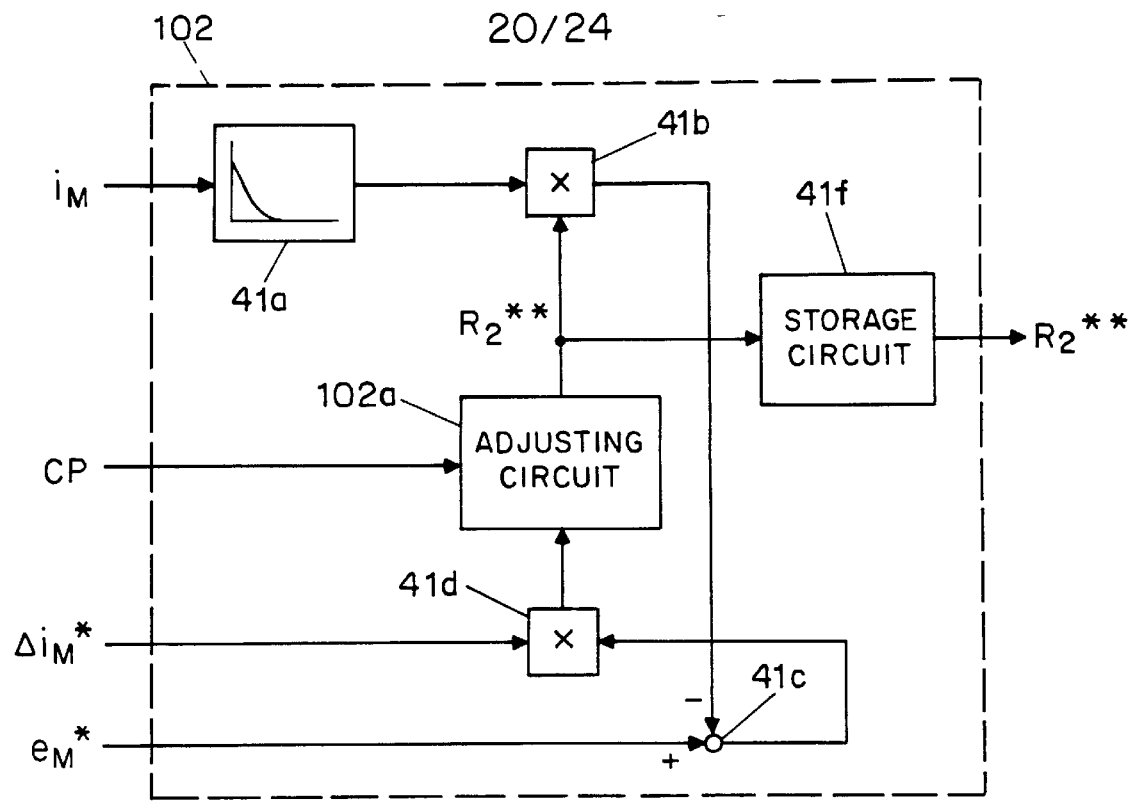
FIG. 27
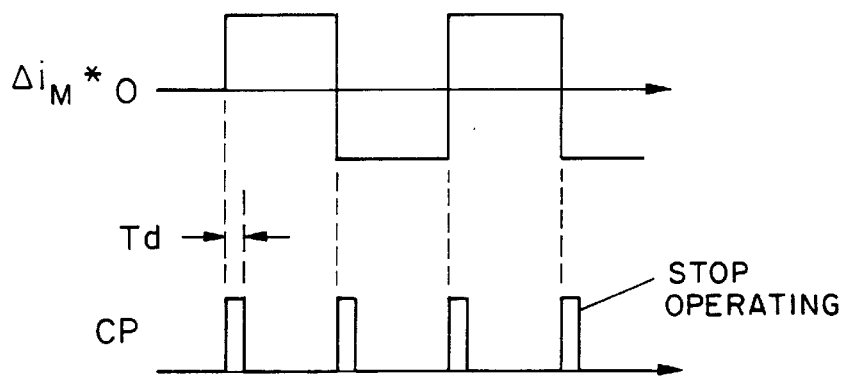
FIG. 28 (a)
FIG. 28 (b)

VARIABLE SPEED CONTROLLER FOR AN AC MOTOR

BACKGROUND OF INVENTION

The present invention relates to a variable speed controller of an AC motor for detecting the voltage and current fed from an electric power converter, for resolving the detected values to the respective M-axis components arbitrarily fixed and T-axis components perpendicular to the M-axis components and for executing trans-vector control of the AC motor based on the M-axis components and the T-axis components.

FIG. 31 is a block diagram of a conventional variable speed controller of an AC motor. Referring to FIG. 31, the reference numeral 1 designates an electric power converter such as a PWM inverter, 2 an induction motor as the AC motor, 3 a current detector for detecting a current flowing from the power converter 1 to the induction motor 2, 4 a speed detector including a pulse generator for detecting the rotating speed of the induction motor 2, and 10 a variable speed control circuit.

The variable speed control circuit 10 includes a speed regulator 12 that executes proportional plus integral operation of the difference between the reference speed $\omega_r^*$ fed from a reference value generator 11 and the actual speed $\omega_r$ detected by the speed detector 4 and outputs a reference torque current value, i.e., a reference T-axis current value, $i_T^*$ of the induction motor 2; a slip frequency operating device 14 that calculates a reference slip frequency $\omega_S^*$ based on the output of the speed regulator 12, the reference secondary magnetic flux $\phi_2^*$ fed from the reference value generator 11 and the set secondary resistance $R_2^*$ set from a secondary resistance setting device 13; an adder 15 that outputs a reference primary angular frequency $\omega_1^*$ that is a sum of the reference slip frequency $\omega_S^*$ and actual speed $\omega_r$; an integrator 16 that integrates the reference primary angular frequency $\omega_1^*$ and outputs a reference phase angle $\theta^*$; a coordinate transformer 17 that executes coordinate transformation of the current detected by the current detector 3 based on the reference phase angle $\theta^*$ to operate an actual M-axis current value $i_M$, i.e., an M-axis component parallel to the magnetic field of the induction motor 2, and an actual T-axis current value $i_T$, i.e., a T-axis component perpendicular to the M-axis; a T-axis current regulator 18 that executes proportional plus integral operation of the difference between the reference T-axis current value $i_T^*$ and the actual T-axis current value $i_T$ and outputs a reference T-axis voltage value $v_T^*$; an M-axis current regulator 18 that executes the proportional plus integral operation of the difference between the reference M-axis current value $i_M^*$ fed from the reference value generator 11 and the actual M-axis current value $i_M$ and outputs a reference M-axis voltage value $v_M^*$; and a coordinate transformer 20 that executes coordinate transformation of the reference T-axis voltage value $v_T^*$ and reference M-axis voltage value $v_M^*$ based on the reference phase angle $\theta^*$ and generates a reference primary voltage value $v_1^*$ fed to the electric power converter 1.

The variable speed control circuit 10 of FIG. 31 executes the so-called slip-frequency trans-vector control. Since the well known techniques are adopted in the constituent devices of the variable speed control circuit 10, the detailed structure of the constituent devices will not be explained.

The slip frequency operating device 14 of the variable speed control circuit 10 operates the following equation (1).

$$\omega_S^* = (R_2^*) \cdot (i_T^*/\phi_2^*) \tag{1}$$

When the set secondary resistance $R_2^*$ is not identical with the actual secondary resistance $R_2$, or when the secondary resistance $R_2$ of the induction motor 2 is unknown, an error is caused in the operated reference slip frequency $\omega_S^*$ and an error is also caused in the torque control of the induction motor 2. To obviate this problem, the set value in the secondary resistance setting device 13 is adjusted by the cut and try method while rotating the induction motor 2.

The Japanese Examined Patent Publication (Koukoku) No. H07-67320 discloses a method that obtains the secondary resistance $R_2$ more exactly in an adaptive state observer based on the detected current value, detected voltage value and actual speed value However, it is necessary for identifying the secondary resistance $R_2$ by this method to rotate, to accelerate and to decelerate the induction motor.

In view of the foregoing, it is an object of the invention to provide a variable speed controller of an AC motor that obtains the secondary resistance of an AC induction motor by operation without experimentally rotating the induction motor.

SUMMARY OF THE INVENTION

According to an aspect of the invention, there is provided a variable speed controller of an AC motor, the variable speed controller including detectors for detecting an actual voltage and an actual current of said AC motor fed from an electric power converter, coordinate transformers for resolving the actual voltage to an M-axis voltage component and a T-axis voltage component perpendicular to the M-axis voltage component and for resolving the actual current to an M-axis current component and a T-axis current component perpendicular to the M-axis current component, the variable speed controller executing trans-vector control of said AC motor based on the M-axis components and said T-axis components, the variable speed controller includes: an AC signal generator, the AC signal generator generating an AC signal with small amplitude during a predetermined period immediately before rotation of said motor; a reference value generator, the reference value generator generating a reference M-axis current value, a reference speed value and a reference secondary magnetic flux value; a first adder, the first adder adding the AC signal and the reference M-axis current value; an M-axis current regulator, the M-axis current regulator executing regulating operation of the difference between the output of the first adder and the actual M-axis current value; a speed regulator, the speed regulator executing regulating operation of the difference between the reference speed value and the actual speed value of the AC motor; a T-axis current regulator, the T-axis current regulator executing regulating operation of the difference between the output of the speed regulator and the actual T-axis current value; a coordinate transformer, the coordinate transformer executing coordinate transformation based on the output of the T-axis current regulator, the output of the M-axis current regulator and a reference phase angle value to generate a gate signal of the electric power converter; an induced voltage operating device, the induced voltage operating device operating an induced M-axis voltage value of the AC motor based on the actual M-axis current value and the actual M-axis voltage value; a slip frequency operating device, the slip frequency operating device operating a slip frequency of the AC motor based on the reference secondary magnetic flux value, the output of the speed regulator and a secondary resistance value; a second adder, the second adder adding the slip frequency and the actual speed value; an integrator, the integrator integrating the output of the second adder, the integrator outputting the result of the integrating as the reference phase angle value; a secondary resistance value generating device, thereto the AC signal, the actual M-axis current value and the operated induced M-axis voltage value being inputted when the AC signal is being generated, the secondary resistance value generating device multiplying the value of the actual M-axis current through a high-pass filter and the secondary resistance value, the secondary resistance value generating device subtracting the result of the multiplying from the operated induced M-axis voltage value, the secondary resistance value generating device multiplying the result of the subtracting and the AC signal to obtain an error signal, the secondary resistance value generating device executing integral or proportional plus integral operation of the error signal to obtain a secondary resistance value, the secondary resistance value generating device storing the secondary resistance value, the secondary resistance value generating device outputting the secondary resistance value; and the variable speed controller executing trans-vector control of the AC motor based on the stored secondary resistance value when the AC motor is rotating.

According to another aspect of the invention, there is provided a variable speed controller of an AC motor, the variable speed controller including detectors for detecting an actual voltage and an actual current of said AC motor fed from an electric power converter, coordinate transformers for resolving the actual voltage to an M-axis voltage component and a T-axis voltage component perpendicular to the M-axis voltage component and for resolving the actual current to an M-axis current component and a T-axis current component perpendicular to the M-axis current component, the variable speed controller executing trans-vector control of said AC motor based on the M-axis components and said T-axis components, the variable speed controller includes: an AC signal generator, the AC signal generator generating an AC signal with small amplitude during a predetermined period immediately before rotation of said motor; a reference value generator, the reference value generator generating a reference M-axis current value, a reference speed value and a reference secondary magnetic flux value; a first adder, the first adder adding the AC signal and the reference M-axis current value; an M-axis current regulator, the M-axis current regulator executing regulating operation of the difference between the output of the first adder and the actual M-axis current value; a speed regulator, the speed regulator executing regulating operation of the difference between the reference speed value and the actual speed value of the AC motor; a T-axis current regulator, the T-axis current regulator executing regulating operation of the difference between the output of the speed regulator and the actual T-axis current value; a coordinate transformer, the coordinate transformer executing coordinate transformation based on the output of the T-axis current regulator, the output of the M-axis current regulator and a reference phase angle value to generate a gate signal of the electric power converter; an induced voltage operating device, the induced voltage operating device operating an induced M-axis voltage value of the AC motor based on the actual M-axis current value and an actual M-axis voltage value; a slip frequency operating device, the slip frequency operating device operating a slip frequency of the AC motor based on the reference secondary magnetic flux value, the output of the speed regulator and a secondary resistance value; a second adder, the second adder adding the slip frequency and the actual speed value; an integrator, the integrator integrating the output of the second adder, the integrator outputting the result of the integrating as the reference phase angle value; a secondary resistance value generating device, thereto the actual M-axis current value and the operated induced M-axis voltage value being inputted when the AC signal is being generated, the secondary resistance value generating device multiplying the value of the actual M-axis current through a high-pass filter and the secondary resistance value, the secondary resistance value generating device subtracting the result of the multiplying from the operated induced M-axis voltage value, the secondary resistance value generating device multiplying the result of the subtracting and the value of the actual M-axis current through the high-pass filter to obtain an error signal, the secondary resistance value generating device executing integral or proportional plus integral operation of the error signal to obtain a secondary resistance value, the secondary resistance value generating device storing the secondary resistance value, the secondary resistance value generating device outputting the new secondary resistance value; and the variable speed controller executing trans-vector control of the AC motor based on the stored secondary resistance value when the AC motor is rotating.

According to a still another aspect of the invention, there is provided a variable speed controller of an AC motor, the variable speed controller including detectors for detecting an actual voltage and an actual current of said AC motor fed from an electric power converter, coordinate transformers for resolving the actual voltage to an M-axis voltage component and a T-axis voltage component perpendicular to the M-axis voltage component and for resolving the actual current to an M-axis current component and a T-axis current component perpendicular to the M-axis current component, the variable speed controller executing trans-vector control of said AC motor based on the M-axis components and said T-axis components, the variable speed controller includes: an AC signal generator, the AC signal generator generating an AC signal with small amplitude during a predetermined period immediately before rotation of said motor; a reference value generator, the reference value generator generating a reference M-axis current value, a reference speed value and a reference secondary magnetic flux value; a first adder, the first adder adding the AC signal and the; reference M-axis current value an M-axis current regulator, the M-axis current regulator executing regulating operation of the difference between the output of the first adder and the actual M-axis current value; a speed regulator, the speed regulator executing regulating operation of the difference between the reference speed value and the actual speed value of the AC motor; a T-axis current regulator, the T-axis current regulator executing regulating operation of the difference between the output of the speed regulator and the actual T-axis current value; a coordinate transformer, the coordinate transformer executing coordinate transformation based on the output of the T-axis current regulator, the output of the M-axis current regulator and a reference phase angle value to generate a gate signal of the electric power converter; an induced voltage operating device, the induced voltage operating device operating an induced M-axis voltage value of the AC motor based on the actual M-axis current value and the actual M-axis voltage value; a slip frequency operating device, the slip frequency operating device operating a slip frequency of the AC motor based on the reference secondary magnetic flux value, the output of the speed regulator and a secondary resistance value; a second adder, the second adder adding the slip frequency and the actual speed value; an integrator, the integrator integrating the output of the second adder, the integrator outputting the result of the integrating as the reference phase angle value; a secondary resistance value generating device, thereto the reference M-axis current value, the actual M-axis current value and the operated induced M-axis voltage value being inputted when the AC signal is being generated, the secondary resistance value generating device multiplying the value of the actual M-axis current through a high-pass filter and the secondary resistance value, the secondary resistance value generating device subtracting the result of the multiplying from the operated induced M-axis voltage value, the secondary resistance value generating device subtracting the reference M-axis current value from the actual M-axis current value, the secondary resistance value generating device multiplying the results of the subtractions to obtain an error signal, the secondary resistance value generating device executing integral or proportional plus integral operation of the error signal to obtain a secondary resistance value, the secondary resistance value generating device storing the secondary resistance value, the secondary resistance value generating device outputting the secondary resistance value; and the variable speed controller executing trans-vector control of the AC motor based on the stored secondary resistance value when the AC motor is rotating.

According to a further aspect of the invention, there is provided a variable speed controller of an AC motor, the variable speed controller including detectors for detecting an actual voltage and an actual current of said AC motor fed from an electric power converter, coordinate transformers for resolving the actual voltage to an M-axis voltage component and a T-axis voltage component perpendicular to the M-axis voltage component and for resolving the actual current to an M-axis current component and a T-axis current component perpendicular to the M-axis current component, the variable speed controller executing trans-vector control of said AC motor based on the M-axis components and said T-axis components, the variable speed controller includes: an AC signal generator, the AC signal generator generating an AC signal with small amplitude during a predetermined period immediately before rotation of said motor; a reference value generator, the reference value generator generating a reference M-axis current value, a reference T-axis voltage value and a reference phase angle; an adder, the adder adding the AC signal and the reference M-axis current value; a current regulator, the current regulator executing regulating operation of the difference between the output of the adder and the actual M-axis current value; a coordinate transformer, the coordinate transformer executing coordinate transformation based on the output of the current regulator, the reference T-axis voltage value and the reference phase angle value to obtain a gate signal of the electric power converter; an induced voltage operating device, the induced voltage operating device operating an induced M-axis voltage value of the AC motor based on the actual M-axis current value and an actual M-axis voltage value; a secondary resistance value generating device, thereto the AC signal, the actual M-axis current value and the operated induced M-axis voltage value being inputted when the AC signal is being generated, the secondary resistance value generating device multiplying the value of the actual M-axis current through a high-pass filter and the secondary resistance value, the secondary resistance value generating device subtracting the result of the multiplying from the operated induced M-axis voltage value, the secondary resistance value generating device multiplying the result of the subtracting and the AC signal to obtain an error signal, the secondary resistance value generating device executing integral or proportional plus integral operation of the error signal to obtain a secondary resistance value, the secondary resistance value generating device storing the secondary resistance value, the secondary resistance value generating device outputting the secondary resistance value; and the variable speed controller executing trans-vector control of the AC motor based on the stored secondary resistance value when the AC motor is rotating.

According to a further aspect of the invention, there is provided a variable speed controller of an AC motor, the variable speed controller including detectors for detecting an actual voltage and an actual current of said AC motor fed from an electric power converter, coordinate transformers for resolving the actual voltage to an M-axis voltage component and a T-axis voltage component perpendicular to the M-axis voltage component and for resolving the actual current to an M-axis current component and a T-axis current component perpendicular to the M-axis current component, the variable speed controller executing trans-vector control of said AC motor based on the M-axis components and said T-axis components, the variable speed controller includes: an AC signal generator, the AC signal generator generating an AC signal with small amplitude during a predetermined period immediately before rotation of said motor; a reference value generator, the reference value generator generating a reference M-axis current value, a reference T-axis voltage value and a reference phase angle; an adder, the adder adding the AC signal and the reference M-axis current value; a current regulator, the current regulator executing regulating operation of the difference between the output of the adder and the actual M-axis current value; a coordinate transformer, the coordinate transformer executing coordinate transformation based on the output of the current regulator, the reference T-axis voltage value and the reference phase angle value to obtain a gate signal of the electric power converter; an induced voltage operating device, the induced voltage operating device operating an induced M-axis voltage value of the AC motor based on the actual M-axis current value and an actual M-axis voltage value; a secondary resistance value generating device, thereto the actual M-axis current value and the operated induced M-axis voltage value being inputted when the AC signal is being generated, the secondary resistance value generating device multiplying the value of the actual M-axis current through a high-pass filter and the secondary resistance value, the secondary resistance value generating device subtracting the result of the multiplying from the operated induced M-axis voltage value, the secondary resistance value generating device multiplying the result of the subtracting and the value of the actual M-axis current through the high-pass filter to obtain an error signal, the secondary resistance value generating device executing integral or proportional plus integral operation of the error signal to obtain a secondary resistance value, the secondary resistance value generating device storing the secondary resistance value, the secondary resistance value generating device outputting the secondary resistance value; and the variable speed controller executing trans-vector control of the AC motor based on the stored secondary resistance value when the AC motor is rotating.

According to a still modified aspect of the invention, there is provided a variable speed controller of an AC motor, the variable speed controller including detectors for detecting an actual voltage and an actual current of said AC motor fed from an electric power converter, coordinate transformers for resolving the actual voltage to an M-axis voltage component and a T-axis voltage component perpendicular to the M-axis voltage component and for resolving the actual current to an M-axis current component and a T-axis current component perpendicular to the M-axis current component, the variable speed controller executing trans-vector control of said AC motor based on the M-axis components and said T-axis components, the variable speed controller includes: an AC signal generator, the AC signal generator generating an AC signal with small amplitude during a predetermined period immediately before rotation of said motor; a reference value generator, the reference value generator generating a reference M-axis current value, a reference T-axis voltage value and a reference phase angle; an adder, the adder adding the AC signal and the reference M-axis current value; a current regulator, the current regulator executing regulating operation of the difference between the output of the adder and the actual M-axis current value; a coordinate transformer, the coordinate transformer executing coordinate transformation based on the output of the current regulator, the reference T-axis voltage value and the reference phase angle value to obtain a gate signal of the electric power converter; an induced voltage operating device, the induced voltage operating device operating an induced M-axis voltage value of the AC motor based on the actual M-axis current value and an actual M-axis voltage value; a secondary resistance value generating device, thereto the reference M-axis current value, the actual M-axis current value and the operated induced M-axis voltage value being inputted when the AC signal is being generated, the secondary resistance value generating device multiplying the value of the actual M-axis current through a high-pass filter and the secondary resistance value, the secondary resistance value generating device subtracting the result of the multiplying from the operated induced M-axis voltage value, the secondary resistance value generating device subtracting the reference M-axis current value from the actual M-axis current value, the secondary resistance value generating device multiplying the results of the subtractions to obtain an error signal, the secondary resistance value generating device executing integral or proportional plus integral operation of the error signal to obtain a secondary resistance value, the secondary resistance value generating device storing the secondary resistance value, the secondary resistance value generating device outputting the secondary resistance value; and the variable speed controller executing trans-vector control of the AC motor based on the stored secondary resistance value when the AC motor is rotating.

Advantageously, the high-pass filter of the secondary resistance value generating device includes an adjusting means for adjusting the cutoff frequency thereof at a predetermined value based on the secondary resistance value.

Advantageously, the secondary resistance value generating device includes a high-pass filter or high-pass filters for filtering either one or both of the actual M-axis current value and the operated induced M-axis current value to obtain a new actual M-axis current value or a new operated induced M-axis current value or to obtain new actual and operated induced M-axis current values, and the secondary resistance value generating device provides the secondary resistance value based on the new current value or the new current values.

Advantageously, the AC signal generator includes a pulse signal generator, the pulse signal generator generating a pulse signal with a predetermined time width in synchronism with the rising and tailing of the AC signal, and the secondary resistance value generating device, to that the pulse signal is inputted, stops operating the secondary resistance value while the pulse signal generator is generating the pulse signal.

BRIEF DESCRIPTION OF THE DRAWINGS

FIG. 27 is a circuit diagram of a still further secondary resistance value generating device used in place of the secondary resistance value generating device of FIG. 14.

FIG. 28 shows the wave forms for explaining the operation of the AC signal generator.

DETAILED DESCRIPTION OF THE INVENTION

Figure 1:
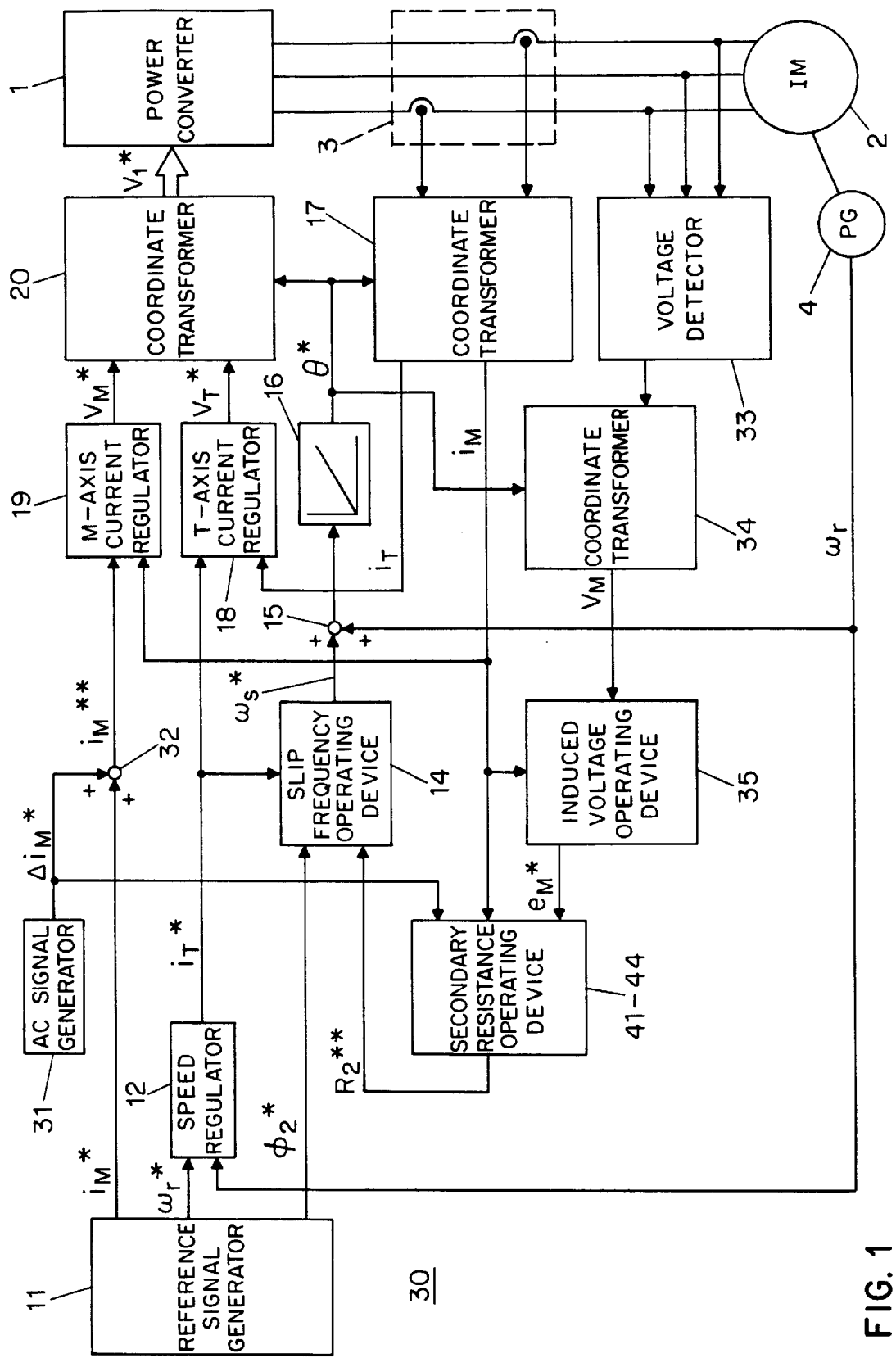
FIG. 1 is a block diagram of a first embodiment of a variable speed controller of an AC motor according to the present invention.
Figure 31:
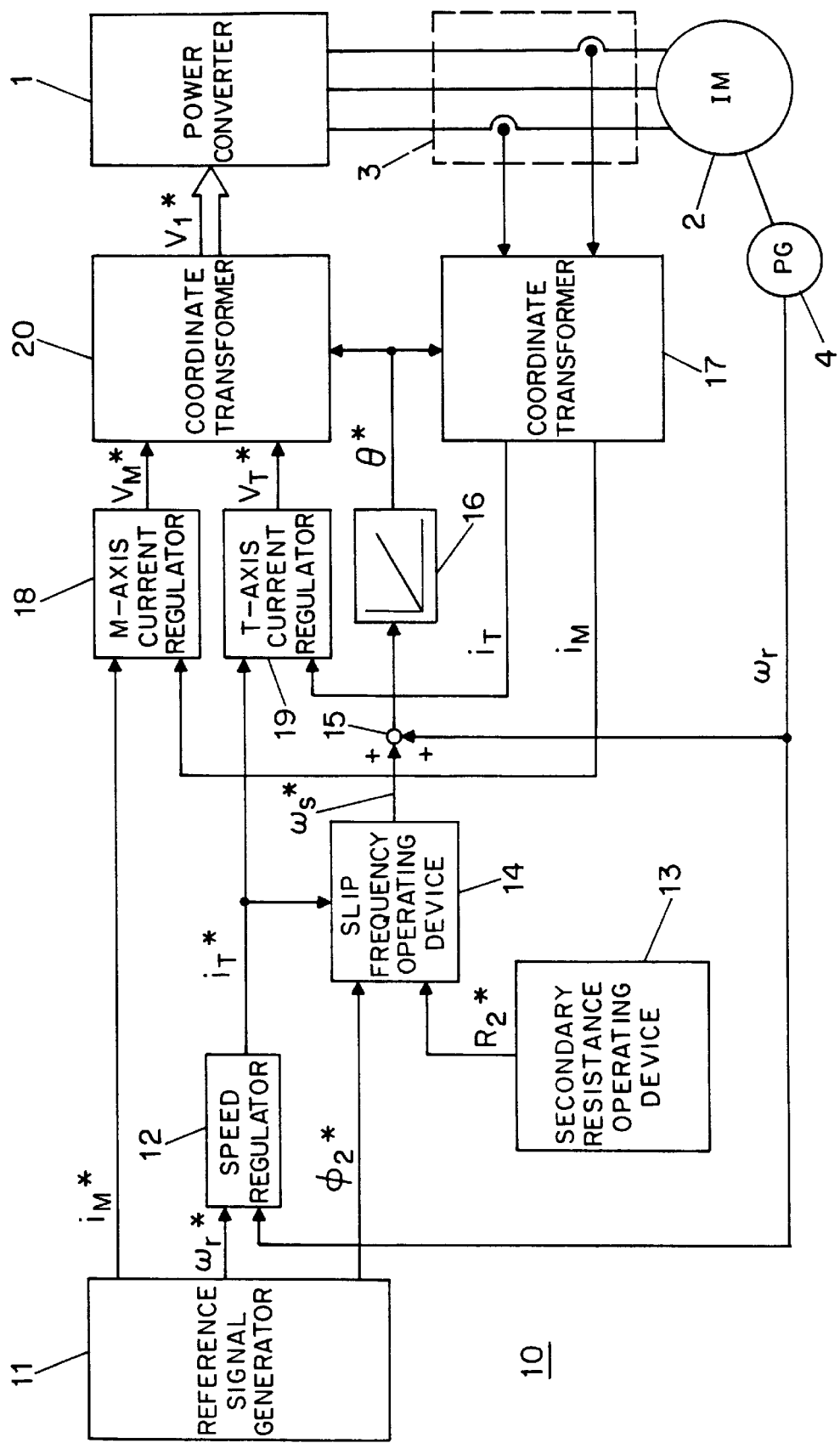
FIG. 31 is a block diagram of a conventional variable speed controller of an AC motor.

FIG. 1 is a block diagram of a first embodiment of a variable speed controller of an AC motor according to the present invention. In FIG. 1, like devices with those of FIG. 31 are designated by the like reference numerals.

Referring now to FIG. 1, a variable speed control circuit 30 includes the reference value generator 11, speed regulator 12, slip frequency operating device 14, adder 15, integrator 16, coordinate transformer 17, T-axis current regulator 18, M-axis current regulator 19 and coordinate transformer 20.

The variable speed control circuit 30 also includes an AC signal generator 31 that generates an AC signal $\Delta i_M^*$ with small amplitude during a predetermined period immediately before rotating the induction motor 2; an adder 32 that adds the reference M-axis axis current value $i_M^*$ fed from the reference value generator 11 and the AC signal $\Delta i_M^*$ and outputs a new reference M-axis current value $i_M^{**}$; a voltage detector 33 that outputs a detected voltage value detected across the induction motor 2; a coordinate transformer 34 that executes coordinate transformation of the detected voltage value based on the foregoing reference phase angle $\theta^*$ and outputs an actual M-axis voltage value $V_M$; an induced voltage operating device 35 that provides an induced M-axis voltage value $e_M^*$ based on the actual M-axis voltage value $V_M$ and the actual M-axis current value $i_M$ fed from the coordinate transformer 17; and either one of secondary resistance value generating devices 41, 42, 43 and 44 which generate, when the AC signal $\Delta i_M^*$ is being generated, the secondary resistance $R_2^{**}$ based on the AC signal $\Delta i_M^*$, operated induced M-axis voltage value $e_M^*$ and actual M-axis current value $i_M$, stores the secondary resistance $R_2^{}$ every time when it is generated, and outputs the stored secondary resistance $R_2^{}$.

Figure 2:
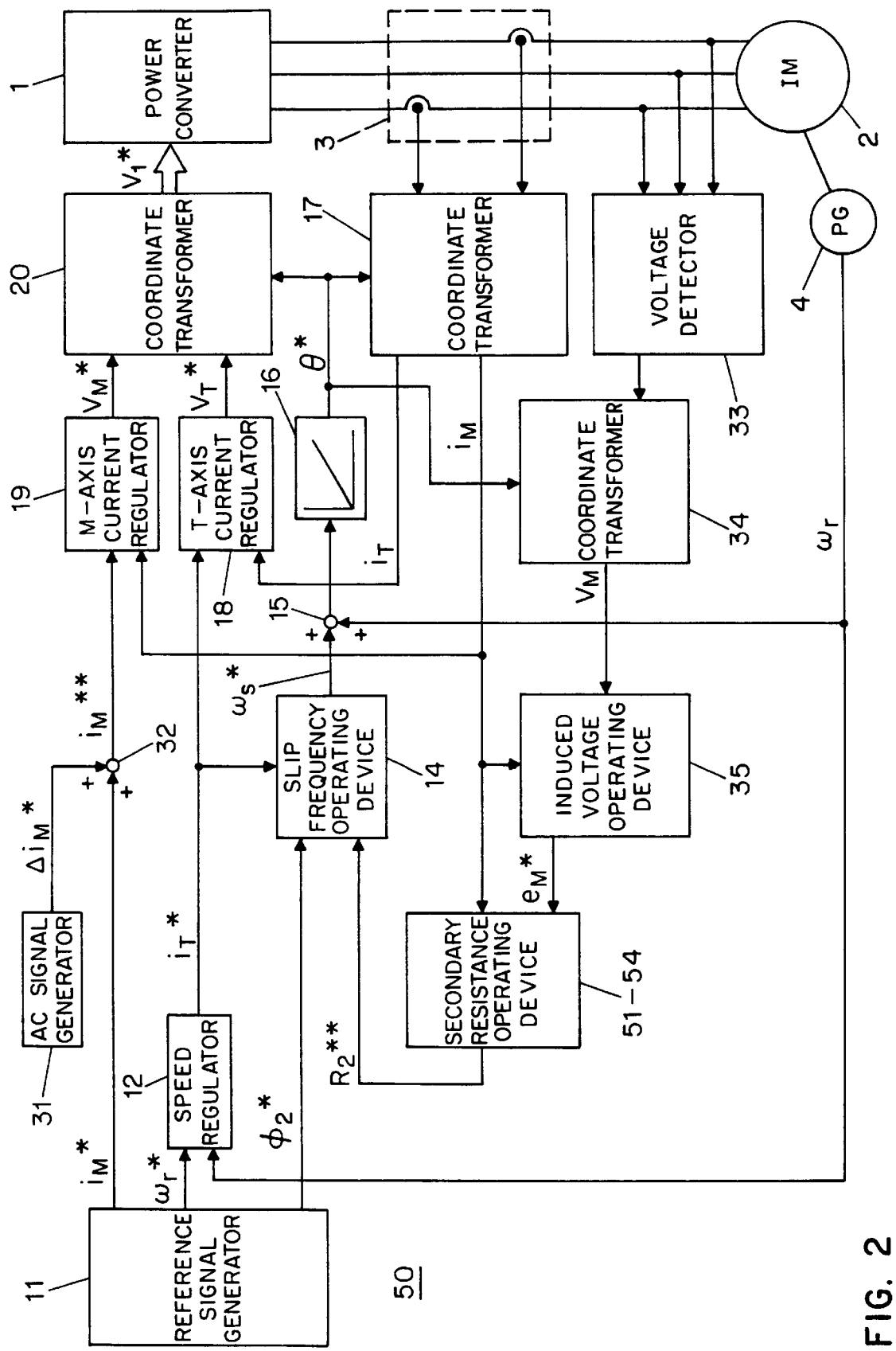
FIG. 2 is a block diagram of a second embodiment of a variable speed controller of an AC motor according to the present invention.

FIG. 2 is a block diagram of a second embodiment of a variable speed controller of an AC motor according to the present invention. In FIG. 2, like devices with those of FIG. 1 are designated by the like reference numerals.

Referring now to FIG. 2, a variable speed control circuit 50 includes the reference value generator 11, the speed regulator 12, the slip frequency operating device 14, the adder 15, the integrator 16, the coordinate transformer 17, the T-axis current regulator 18, the M-axis current regulator 19, the coordinate transformer 20, the AC signal generator 31, the adder 32, the voltage detector 33, the coordinate transformer 34 and the induced voltage operating device 35. The variable speed control circuit 50 includes either one of secondary resistance value generating devices 51, 52, 53 and 54 which generate, when the AC signal $\Delta i_M^*$ is being generated, the secondary resistance $R_2^{**}$ based on the operated induced M-axis voltage value $e_M^*$ and actual M-axis current value $i_M$, store the secondary resistance $R_2^{}$ every time when it is generated and output the stored secondary resistance $R_2^{}$.

Figure 3:
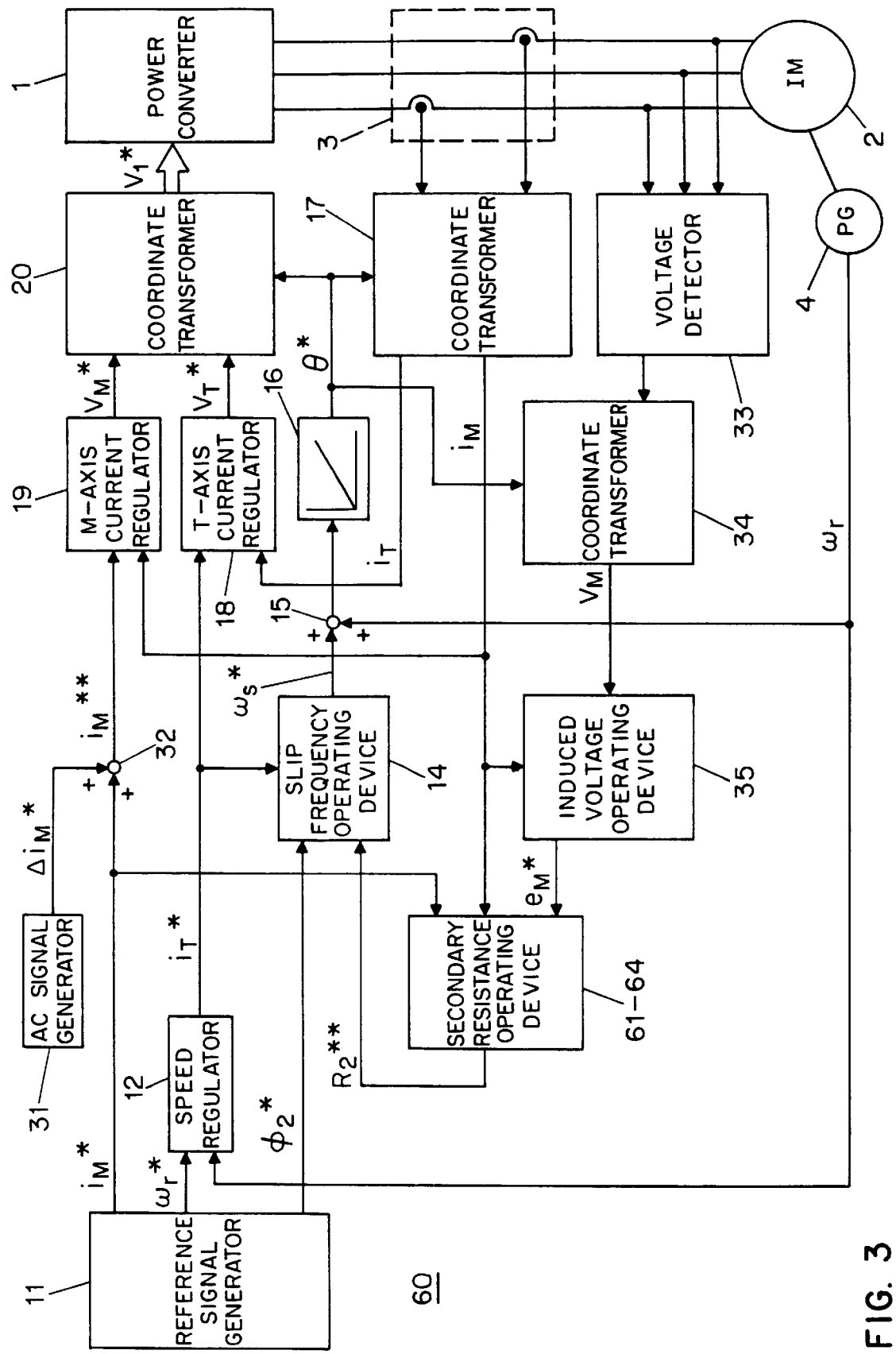
FIG. 3 is a block diagram of a third embodiment of a variable speed controller of an AC motor according to the present invention.

FIG. 3 is a block diagram of a third embodiment of a variable speed controller of an AC motor according to the present invention. In FIG. 3, like devices with those of FIG. 1 are designated by the like reference numerals.

Referring now to FIG. 3, a variable speed control circuit 60 includes the reference value generator 11, the speed regulator 12, the slip frequency operating device 14, the adder 15, the integrator 16, the coordinate transformer 17, the T-axis current regulator 18, the M-axis current regulator 19, the coordinate transformer 20, the AC signal generator 31, the adder 32, the voltage detector 33, the coordinate transformer 34 and the induced voltage operating device 35. The variable speed control circuit 60 includes either one of secondary resistance value generating devices 61, 62, 63 and 64 which generate, when the AC signal $\Delta i_M^*$ is being generated, the secondary resistance $R_2^{**}$ based on the reference M-axis current value $i_M^*$, operated induced M-axis voltage value $e_M^*$ and actual M-axis current value $i_M$, store the secondary resistance $R_2^{}$ every time when it is generated and output the stored secondary resistance $R_2^{}$.

Figure 4:
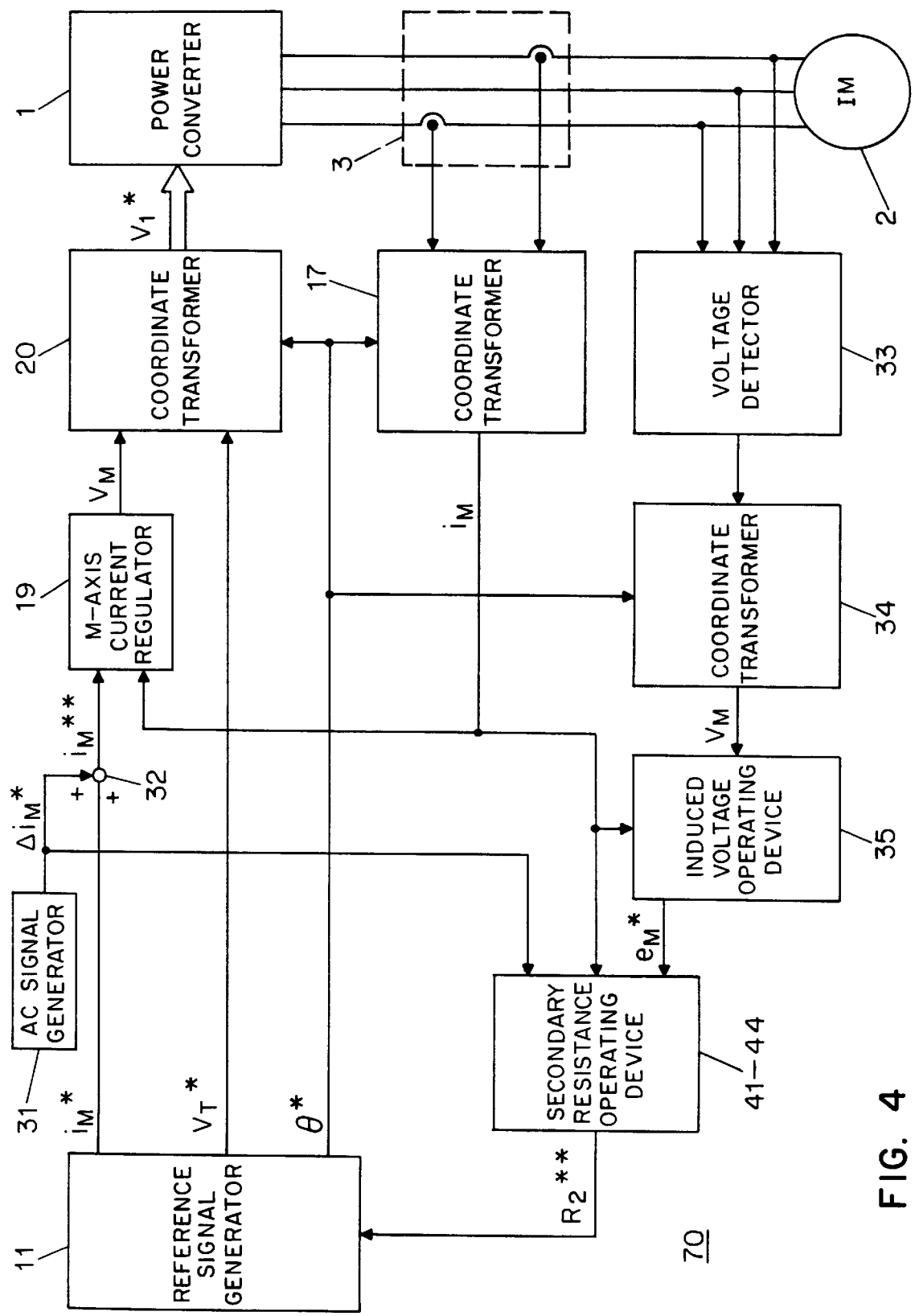
FIG. 4 is a block diagram of a fourth embodiment of a variable speed controller of an AC motor according to the present invention.

FIG. 4 is a block diagram of a fourth embodiment of a variable speed controller of an AC motor according to the present invention. In FIG. 4, like devices with those of FIG. 1 are designated by the like reference numerals.

Referring now to FIG. 4, a variable speed control circuit 70 includes a reference value generator 71 that generates the predetermined reference M-axis current value $i_M^*$, reference T-axis voltage value $v_T^*$ and reference phase angle $\theta^*$; the coordinate transformer 17 that executes coordinate transformation based on the reference phase angle $\theta^*$; the M-axis current regulator 19; the coordinate transformer 20 that executes coordinate transformation based on the reference M-axis voltage value $v_M^*$ outputted from the M-axis current regulator 19, reference T-axis voltage value $v_T^*$ and reference phase angle $\theta^*$; the AC signal generator 31; the adder 32 that adds the reference M-axis current value $i_M^*$ and the AC signal $\Delta i_M^*$ and outputs the new reference M-axis current value $i_M^{**}$; the voltage detector 33; the coordinate transformer 34 that executes coordinate transformation based on the reference phase angle $\theta^*$ and outputs the actual M-axis voltage value $V_M$; the induced voltage operating device 35; and either one of the secondary resistance value generating devices 41, 42, 43 and 44.

Figure 5:
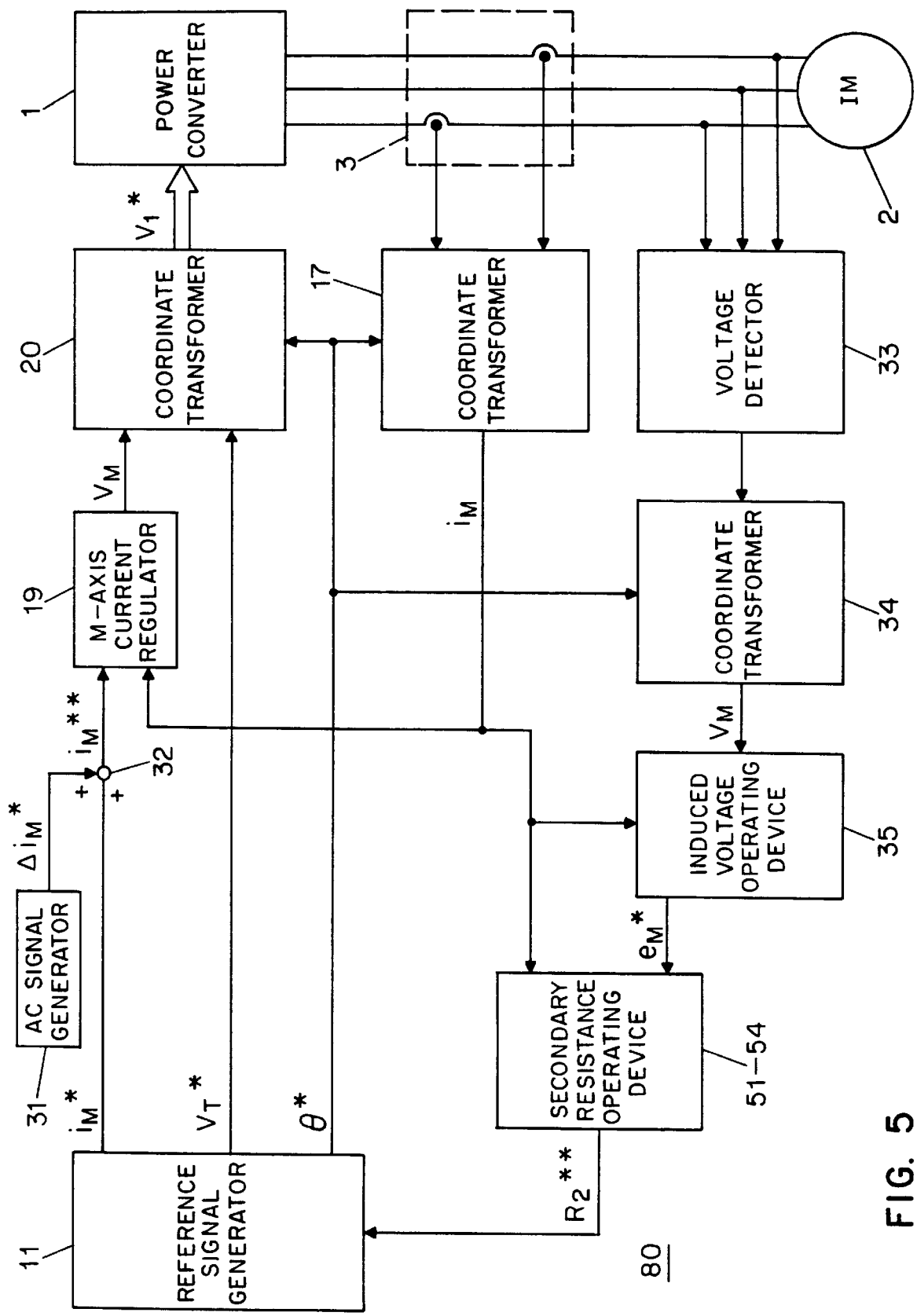
FIG. 5 is a block diagram of a fifth embodiment of a variable speed controller of an AC motor according to the present invention.

FIG. 5 is a block diagram of a fifth embodiment of a variable speed controller of an AC motor according to the present invention. In FIG. 5, like devices with those of FIG. 2 or 4 are designated by the like reference numerals.

Referring now to FIG. 5, a variable speed control circuit 80 includes the reference value generator 71; the coordinate transformer 17; the M-axis current regulator 19; the coordinate transformer 20; the AC signal generator 31; the adder 32; the voltage detector 33; the coordinate transformer 34; the induced voltage operating device 35; and either one of the secondary resistance value generating devices 51, 52, 53 and 54.

Figure 6:
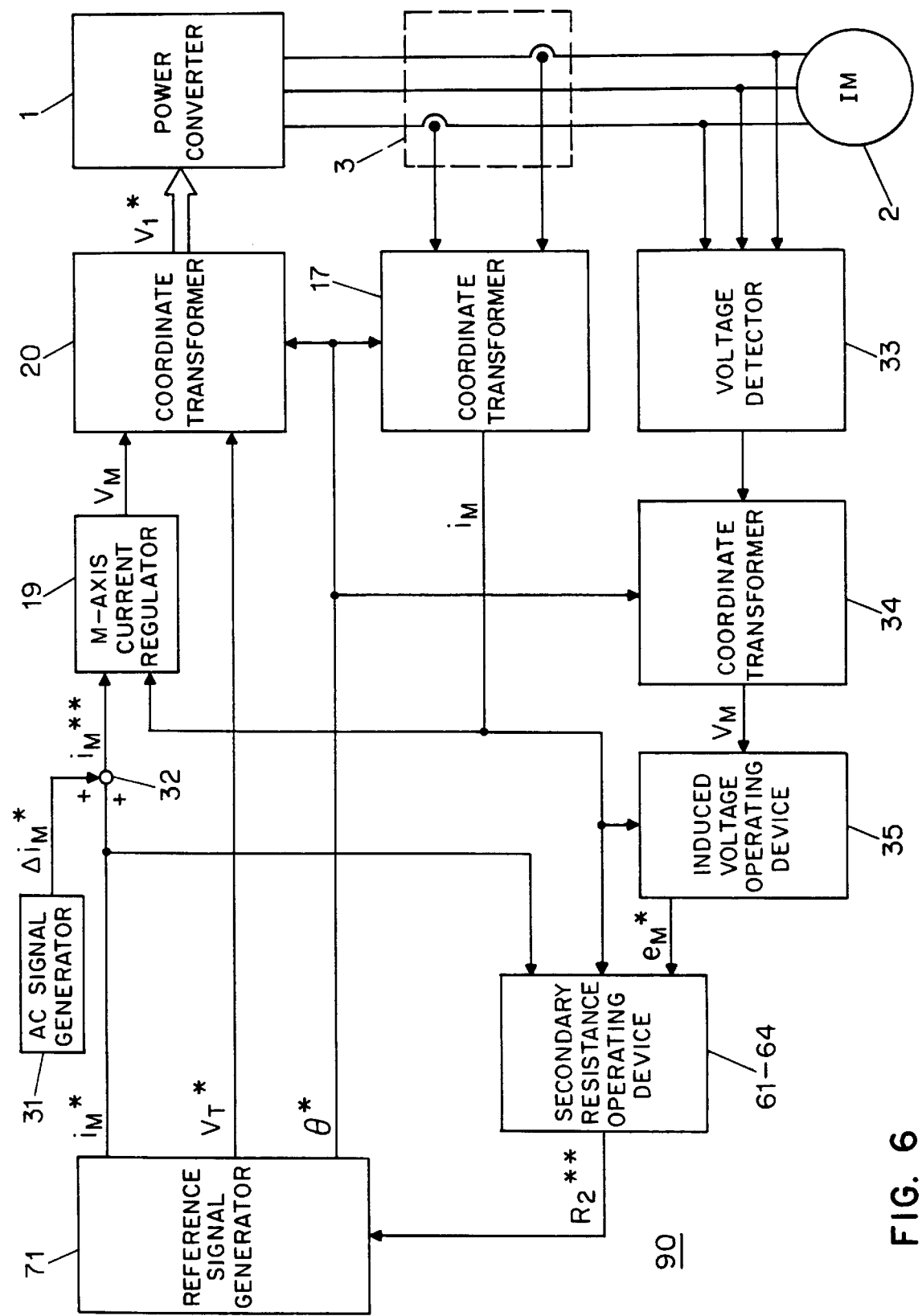
FIG. 6 is a block diagram of a sixth embodiment of a variable speed controller of an AC motor according to the present invention.

FIG. 6 is a block diagram of a sixth embodiment of a variable speed controller of an AC motor according to the present invention. In FIG. 6, like devices with those of FIG. 3 or 4 are designated by the like reference numerals.

Figure 7:
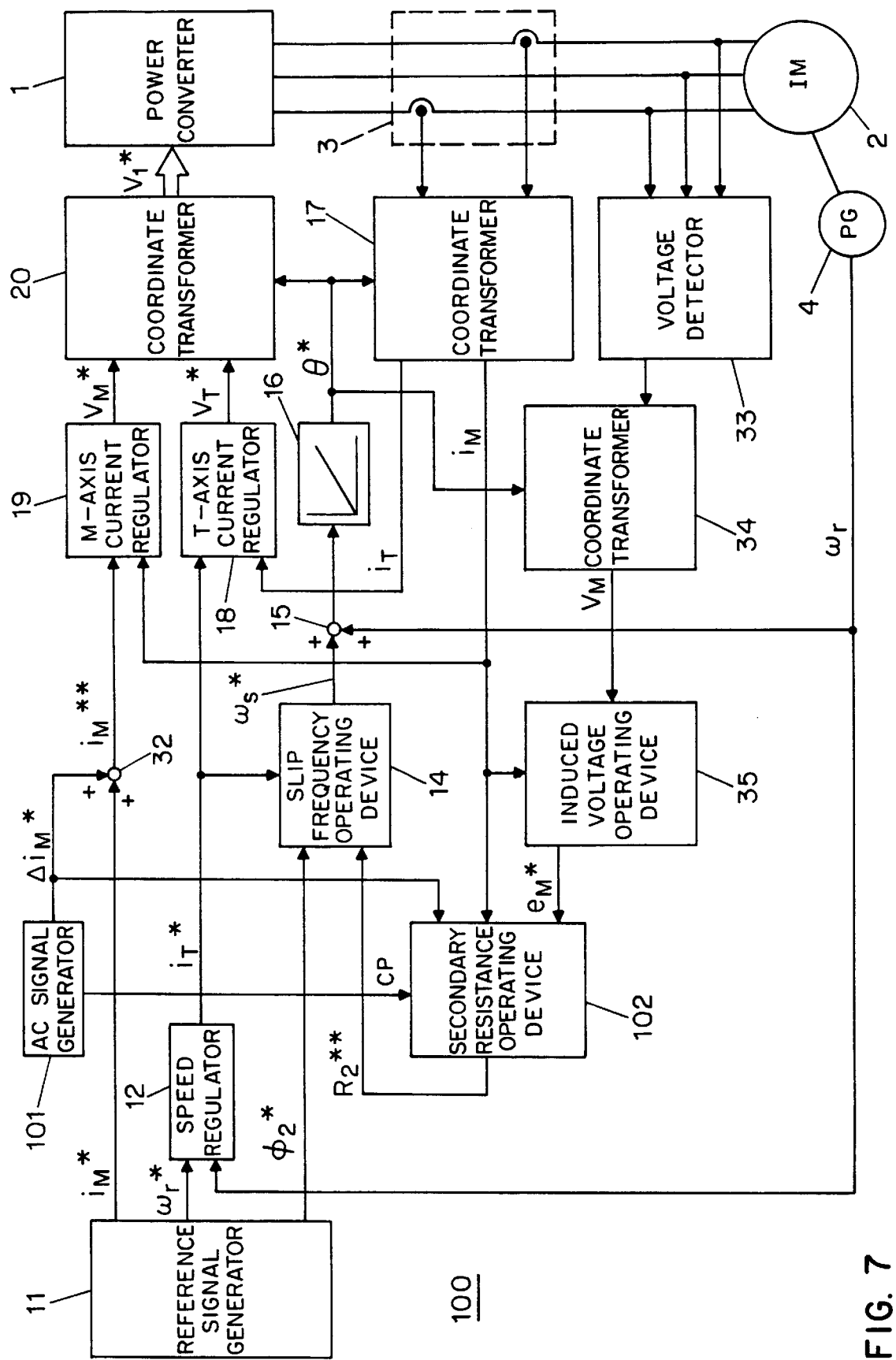
FIG. 7 is a block diagram of a seventh embodiment of a variable speed controller of an AC motor according to the present invention.

Referring now to FIG. 6, a variable speed control circuit 90 includes the reference value generator 71; the coordinate transformer 17; the M-axis current regulator 19; the coordinate transformer 20; the AC signal generator 31; the adder 32; the voltage detector 33; the coordinate transformer 34; the induced voltage operating device 35; and either one of the secondary resistance value generating devices 61, 62, 63 and FIG. 7 is a block diagram of a seventh embodiment of a variable speed controller of an AC motor according to the present invention. In FIG. 7, like devices with those of FIG. 1 are designated by the like reference numerals.

Referring now to FIG. 7, a variable speed control circuit 100 includes the reference value generator 11, the speed regulator 12, the slip frequency operating device 14, the adder 15, the integrator 16, the coordinate transformer 17, the T-axis current regulator 18, the M-axis current regulator 19, the coordinate transformer 20, the adder 32, the voltage detector 33, the coordinate transformer 34 and the induced voltage operating device 35. The variable speed control circuit 100 also includes an AC signal generator 101 that generates an AC signal $\Delta i_M^*$ with small amplitude during a predetermined period immediately before rotating the induction motor 2 and that generates a pulse signal with a predetermined time width in synchronism with the rising and tailing of the AC signal $\Delta i_M^*$; and a secondary resistance value generating device 102 that operates, when the pulse signal is not existing, the secondary resistance $R_2^{**}$ based on the AC signal $\Delta i_M^*$, induced M-axis voltage value $e_M^*$ and actual M-axis current value $i_M$, stores the secondary resistance $R_2^{}$ every time when it is generated, stops the above described operation, when the pulse signal is existing, and outputs the stored secondary resistance $R_2^{}$.

Figure 8:
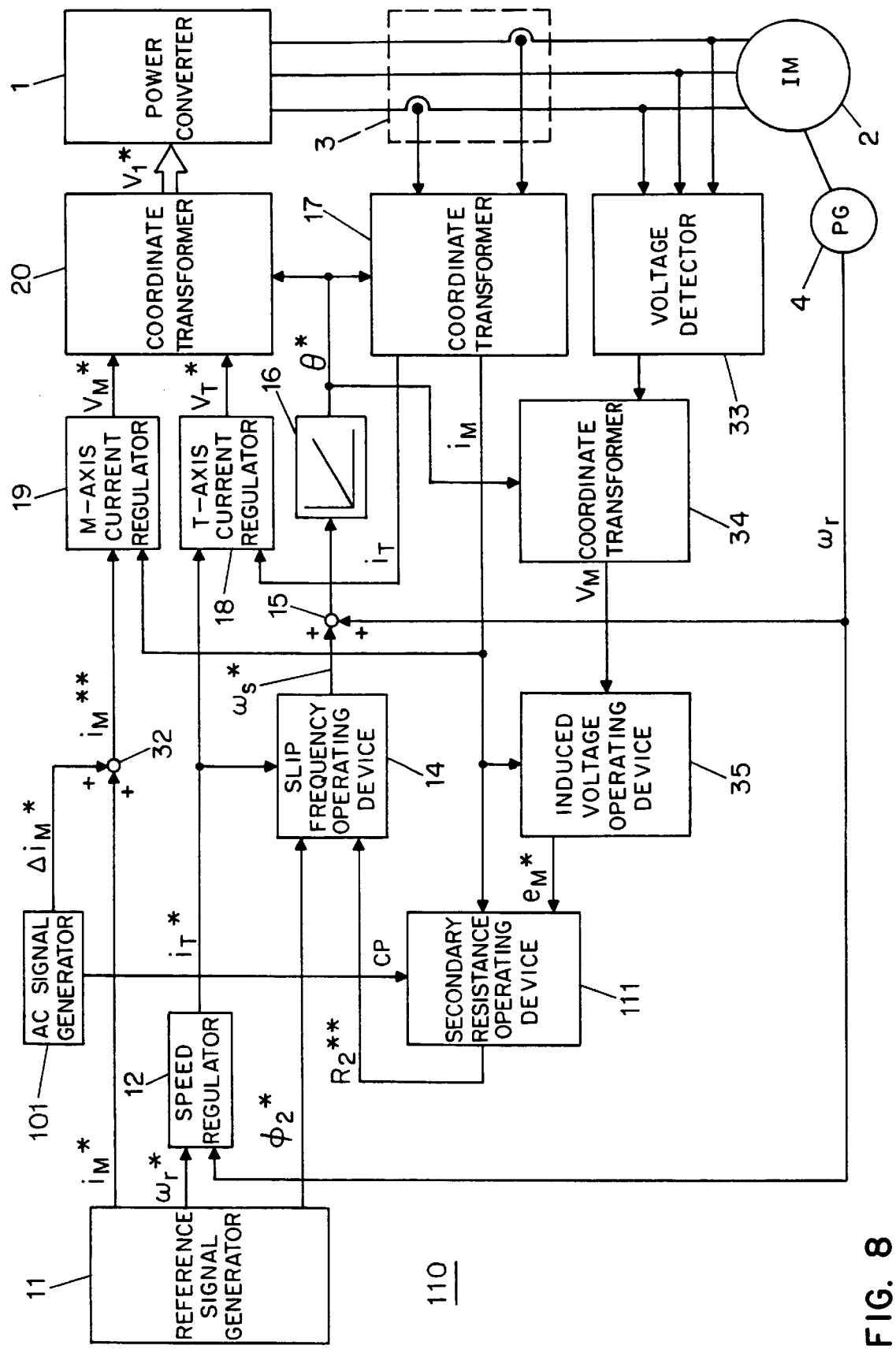
FIG. 8 is a block diagram of a eighth embodiment of a variable speed controller of an AC motor according to the present invention.

FIG. 8 is a block diagram of an eighth embodiment of a variable speed controller of an AC motor according to the present invention. In FIG. 8, like devices with those of FIG. 1 are designated by the like reference numerals.

Referring now to FIG. 8, a variable speed control circuit 110 includes the reference value generator 11, the speed regulator 12, the slip frequency operating device 14, the adder 15, the integrator 16, the coordinate transformer 17, the T-axis current regulator 18, the M-axis current regulator 19, the coordinate transformer 20, the adder 32, the voltage detector 33, the coordinate transformer 34, the induced voltage operating device 35 and the AC signal generator 101. The variable speed control circuit 110 also includes a secondary resistance value generating device 111 that operates, when the pulse signal generated from the AC signal generator 101 is not existing, the secondary resistance $R_2^{**}$ based on the operated induced M-axis voltage value $e_M^*$ and actual M-axis current value $i_M$, stores the secondary resistance $R_2^{}$ every time when it is generated, stops the above described operation, when the pulse signal is existing, and outputs the stored secondary resistance $R_2^{}$.

Figure 9:
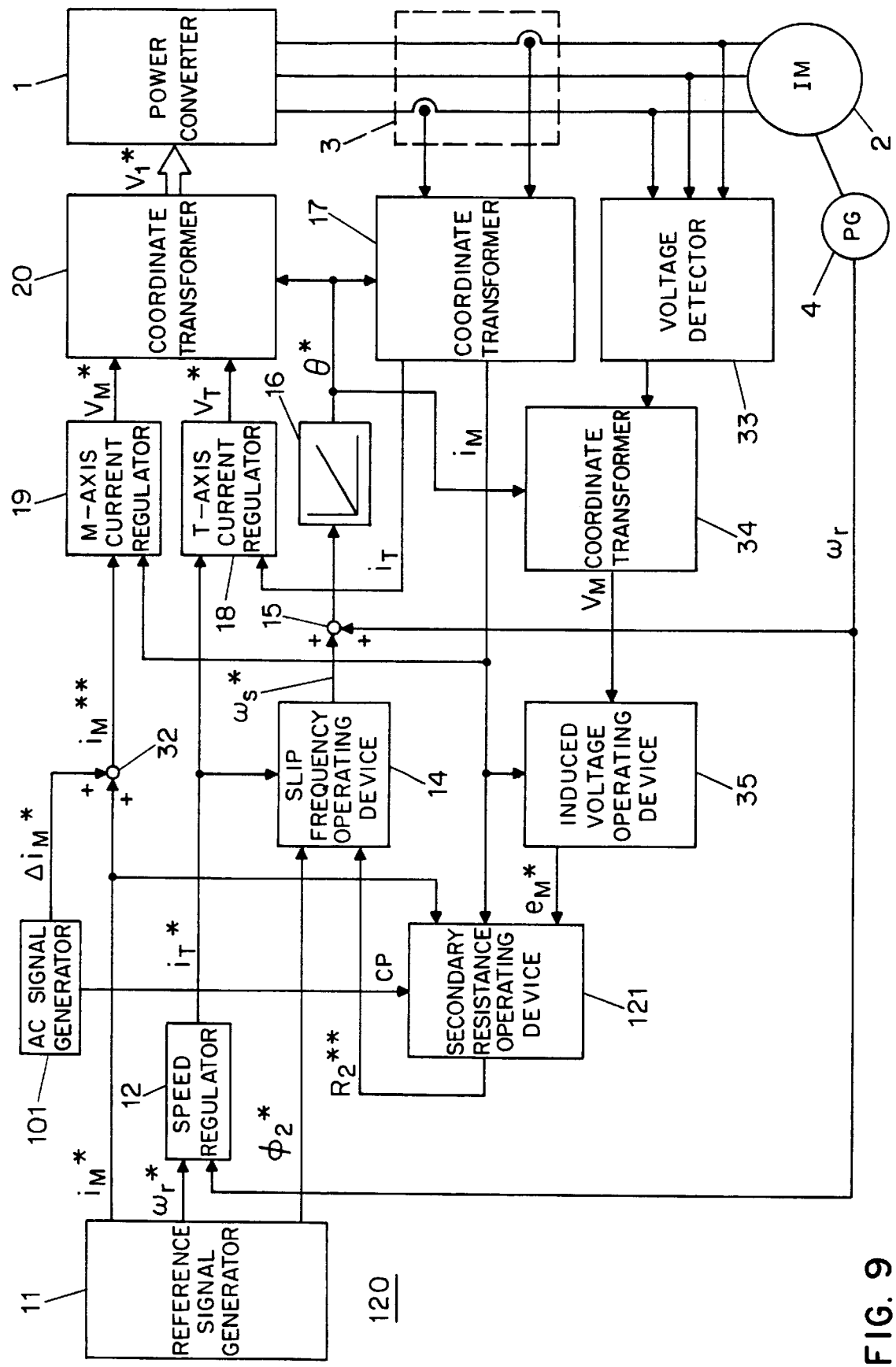
FIG. 9 is a block diagram of a ninth embodiment of a variable speed controller of an AC motor according to the present invention.

FIG. 9 is a block diagram of a ninth embodiment of a variable speed controller of an AC motor according to the present invention. In FIG. 9, like devices with those of FIG. 1 are designated by the like reference numerals.

Referring now to FIG. 9, a variable speed control circuit 120 includes the reference value generator 11, the speed regulator 12, the slip frequency operating device 14, the adder 15, the integrator 16, the coordinate transformer 17, the T-axis current regulator 18, the M-axis current regulator 19, the coordinate transformer 20, the adder 32, the voltage detector 33, the coordinate transformer 34, the induced voltage operating device 35 and the AC signal generator 101. The variable speed control circuit 110 also includes a secondary resistance value generating device 121 that operates, when the pulse signal generated from the AC signal generator 101 is not existing, the secondary resistance $R_2^{**}$ based on the reference M-axis current value $i_M^*$, operated induced M-axis voltage value $e_M^*$ and actual M-axis current value $i_M$, stores the secondary resistance $R_2^{}$ every time when it is generated, stops the above described operation, when the pulse signal is existing, and outputs the stored secondary resistance $R_2^{}$.

Figure 10:
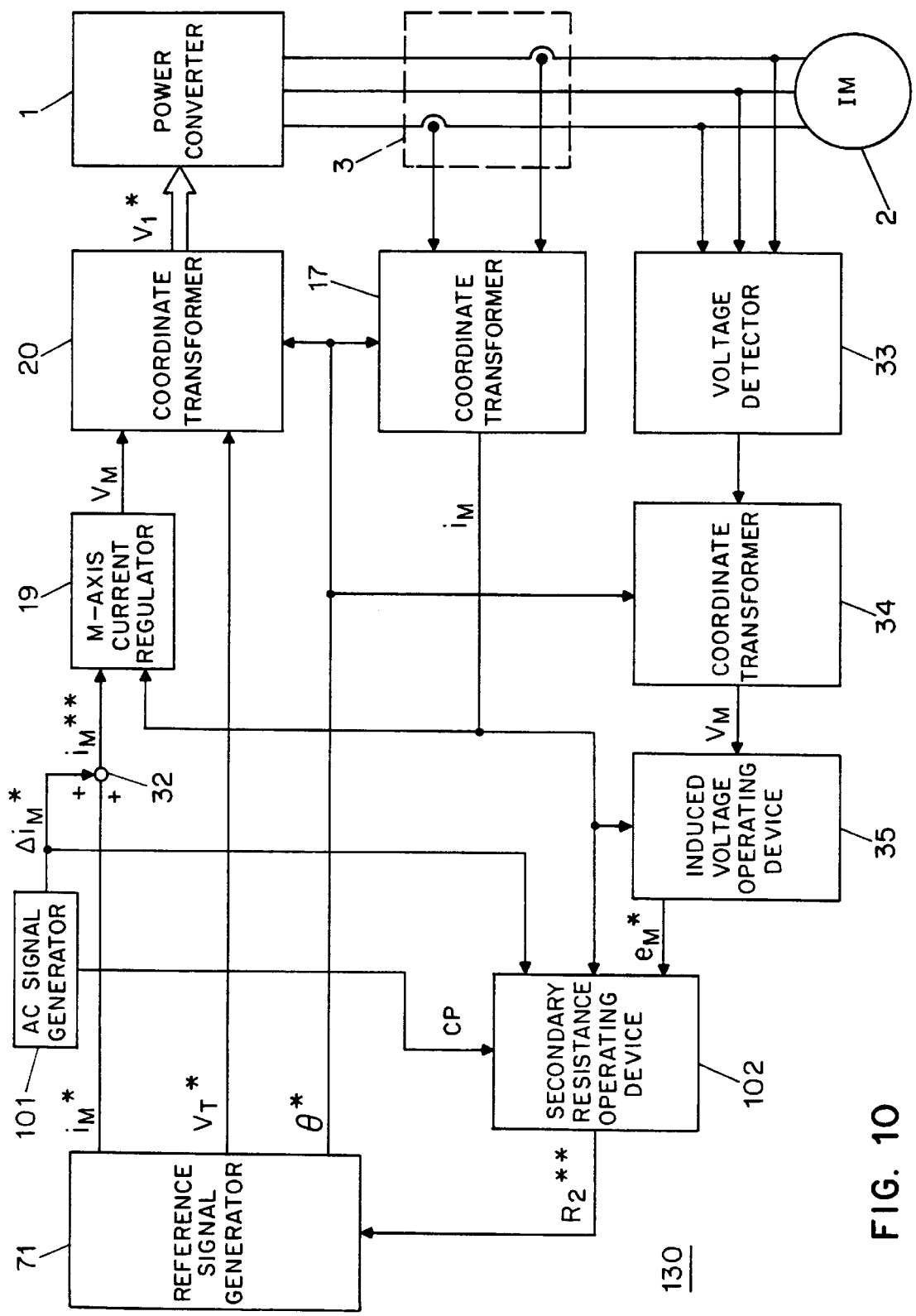
FIG. 10 is a block diagram of a tenth embodiment of a variable speed controller of an AC motor according to the present invention.

FIG. 10 is a block diagram of a tenth embodiment of a variable speed controller of an AC motor according to the present invention. In FIG. 10, like devices with those of FIG. 4 or 7 are designated by the like reference numerals.

Referring now to FIG. 10, a variable speed control circuit 130 includes the reference value generator 71, the coordinate transformer 17, the M-axis current regulator 19, the coordinate transformer 20, the adder 32, the voltage detector 33, the coordinate transformer 34, the induced voltage operating device 35, the AC signal generator 101 and the secondary resistance value generating device 102.

Figure 11:
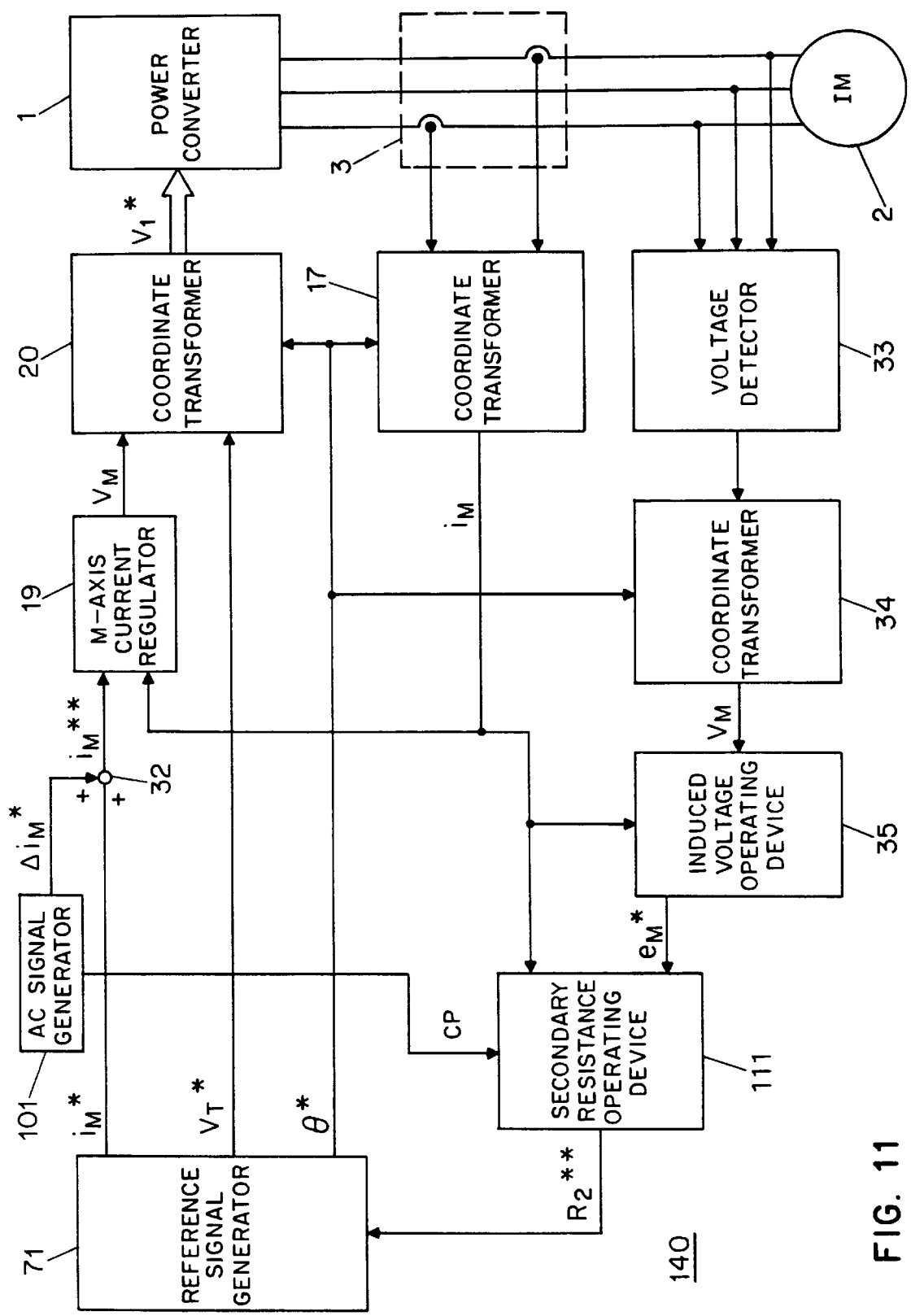
FIG. 11 is a block diagram of an eleventh embodiment of a variable speed controller of an AC motor according to the present invention.

FIG. 11 is a block diagram of an eleventh embodiment of a variable speed controller of an AC motor according to the present invention. In FIG. 11, like devices with those of FIG. 5 or 8 are designated by the like reference numerals.

Referring now to FIG. 11, a variable speed control circuit 140 includes the reference value generator 71, the coordinate transformer 17, the M-axis current regulator 19, the coordinate transformer 20, the adder 32, the voltage detector 33, the coordinate transformer 34, the induced voltage operating device 35, the AC signal generator 101 and the secondary resistance value generating device 111.

Figure 12:
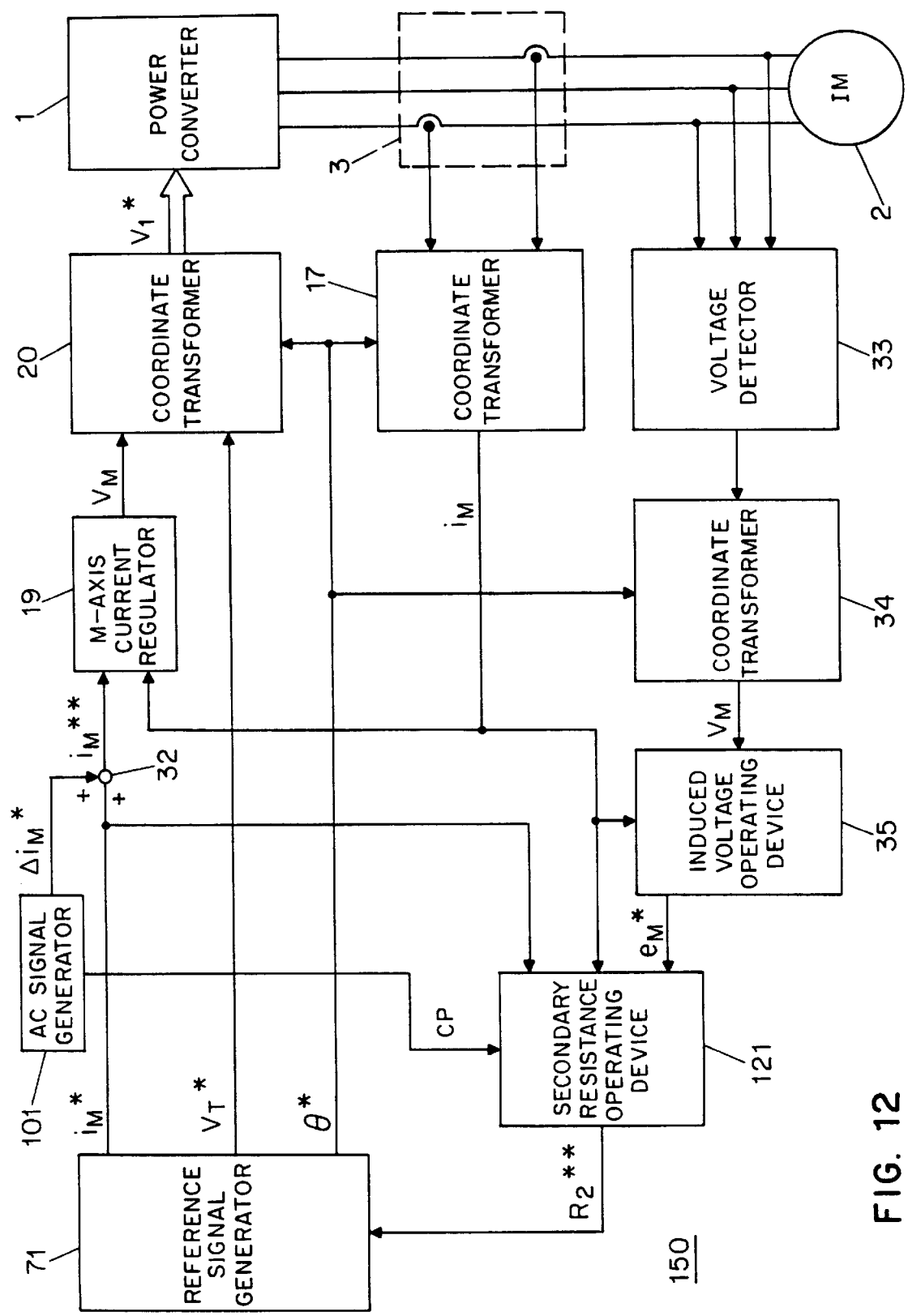
FIG. 12 is a block diagram of a twelfth embodiment of a variable speed controller of an AC motor according to the present invention.

FIG. 12 is a block diagram of a twelfth embodiment of a variable speed controller of an AC motor according to the present invention. In FIG. 12, like devices with those of FIG. 6 or 9 are designated by the like reference numerals.

Referring now to FIG. 12, a variable speed control circuit 150 includes the reference value generator 71, the coordinate transformer 17, the M-axis current regulator 19, the coordinate transformer 20, the adder 32, the voltage detector 33, the coordinate transformer 34, the induced voltage operating device 35, the AC signal generator 101 and the secondary resistance value generating device 121.

The variable speed controllers of FIGS. 4 through 6 and FIGS. 10 through 12 execute the so-called speed-sensor-less trans-vector control.

Now, the operation of the variable speed controller of the invention will be explained hereinafter with accompanied drawing figures.

Figure 13:
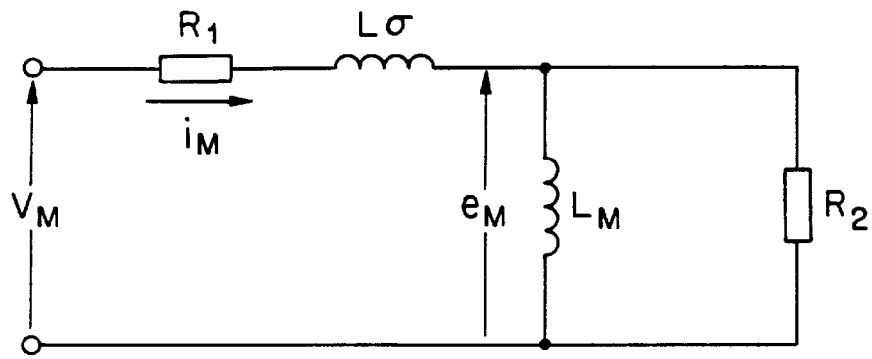
FIG. 13 is an equivalent circuit of the induction motor immediately before the induction motor is rotated

FIG. 13 is an equivalent circuit of the induction motor 2 immediately before the induction motor 2 is rotated, that is in the DC-excitation state of the induction motor 2.

The transfer function $E_M(s)/I_M(s)$ from the actual M-axis current value $I_M$ to the actual induced M-axis current value $E_M$ is expressed by the following equation (2)

$$E_M(s)/I_M(s) = s\, L_M \cdot R_2/(s\, L_M + R_2) = R_2 \cdot s\, \tau_2/(s\, \tau_2 + 1) \quad (2)$$

Here, $\tau_2$ ($=L_M/R_2$) is a secondary time constant, $L_M$ the exciting inductance, and $R_2$ a secondary resistance value.

By the inverse Laplace transformation of the equation (2), the relation between the actual induced M-axis voltage value $e_M$ and the actual M-axis current value $i_M$ is expressed by the following equation (3).

$$e_M = R_2 \exp(-t/\tau_2) i_M \quad (3)$$

Figure 14:
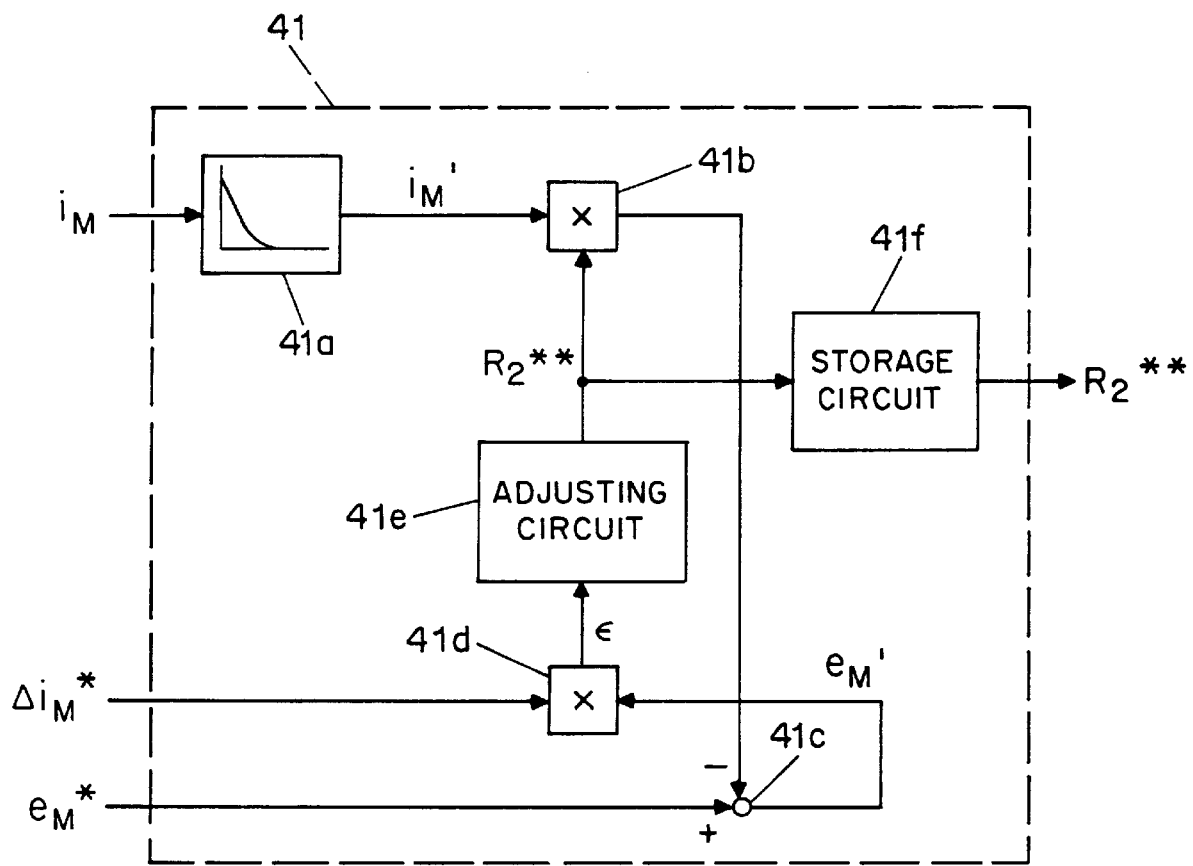
FIG. 14 is a circuit diagram of the secondary resistance value generating device used in the variable speed controllers shown in FIGS. 1 and 4.

FIG. 14 is a circuit diagram of the secondary resistance value generating device 41 used in the variable speed controllers shown in FIGS. 1 and 4.

The AC signal $\Delta i_M{}^*$, actual M-axis current value $i_M$ and operated induced M-axis voltage value $e_M{}^*$ are inputted to the secondary resistance value generating device 41. The secondary resistance value generating device 41 includes a high-pass filter 41a, a multiplier 41b, an adder 41c, a multiplier 41d, an adjusting circuit 41e and a storage circuit 41f. The multiplier 41b multiplies a value $i_M'$, obtained by making the actual M-axis axis current value $i_M$ pass the high-pass filter 41a, and the secondary resistance $R_2{}^{**}$. The adder 41c calculates a value $e_M{}^*$ by subtracting the output of the multiplier 41b from the operated induced M-axis voltage value $e_M{}^*$. The multiplier 41d obtains an error signal $\epsilon$ by multiplying the value $e_M{}^*$ and the AC signal $\Delta i_M{}^*$. The storage circuit 41f stores the value, obtained in the adjusting circuit 41e by the integral or proportional plus integral operation of the error signal $\epsilon$, as a new secondary resistance $R_2{}^{}$. The storage circuit 41f outputs the new secondary resistance $R_2{}^{}$ every time when the new secondary resistance $R_2{}^{**}$ is obtained.

The operation of the secondary resistance value generating device 41 will be explained below.

For the sake of simplifying the following explanation, the time constant ($\frac{1}{2}\pi f_c$), corresponding to the cutoff frequency $f_c$ of the high-pass filter 41a, is assumed to be equal to the secondary time constant $\tau_2$. Then, the foregoing $e_M'$ is expressed by the following equation (4).

$$e_M' = e_M{}^* - R_2{}^{**}) \exp(-t/\tau_2) i_M \quad (4)$$

By substituting the equation (3) for the equation (4), $e_M'$ is expressed by the following equation (5).

$$e_M' = R_2 - R_2{}^{**}) \exp(-t/\tau_2) i_M \quad (5)$$

Although $e_M'$ is zero in the steady state when the foregoing $i_M$ is a DC quantity, $e_M'$ changes transiently due to the AC component $\Delta i_M$ caused by the AC signal $\Delta i_M{}^*$ from the AC signal generator 31 shown in FIGS. 1 through 6. Then, the following relations hold between $e_M'$ and $\Delta i_M$, the operation wave forms thereof are illustrated in FIG. 15.

Figure 15:
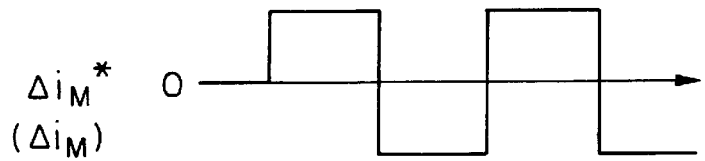
FIG. 15 shows the wave forms for explaining the operation of the secondary resistance value generating device of FIG. 14.
Figure 15:
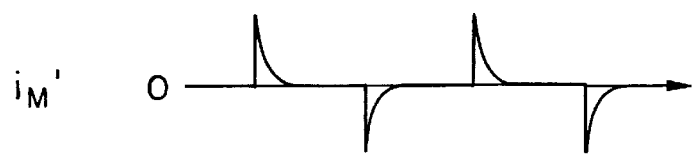
Figure 15:
Figure 15:
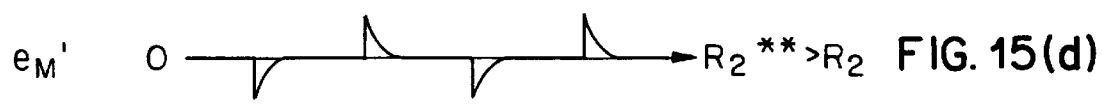

When $R_2{}^{**} > R_2$, $e_M'$ and $\Delta i_M$ are opposite in sign (cf. (d) in FIG. 15).

When $R_2{}^{**} < R_2$, $e_M'$ and $\Delta i_M$ are same in sign (cf. (c) in FIG. 15).

Therefore, the error signal $\epsilon$, obtained by multiplying $e_M'$ and $\Delta i_M$ or a signal same in sign with $\Delta i_M$ such as $\Delta i_M{}^*$ (cf. (a) in FIG. 15) in the multiplier 41d, has the following relations.

When $R_2{}^{**} > R_2$, $\epsilon < 0$.
When $R_2{}^{**} < R_2$, $\epsilon > 0$.

The adjusting circuit 41e executes the operation described by the following equation (6).

$$R_2{}^{**} = K_P \cdot \epsilon + K_I \int \epsilon\, dt \quad (6)$$

Here, $K_P$ is a proportional time constant and $K_I$ an integral time constant. When the adjusting circuit 41e executes the integral operation only, $K_P$ in the equation (6) is set at 0.

By operating the equation (6) in the secondary resistance value generating device 41, the secondary resistance $R_2{}^{**}$ converges to the secondary resistance $R_2$.

The induced voltage operating device 35 in FIGS. 1 through 12 executes the operation described by the following equation (7).

$$e_M{}^* = v_M - R_1{}^* \cdot i_M - pL\, \sigma^* \cdot i_M \quad (7)$$

Here, $R_1{}^*$ is a set value of the primary resistance based on the primary resistance $R_1$ of the induction motor 2 in the equivalent circuit of FIG. 13, and $L\, \sigma^*$ a set value of the leakage inductance based on the leakage inductance $L\, \sigma$ of the induction motor 2 in the equivalent circuit of FIG. 13.

Figure 16:
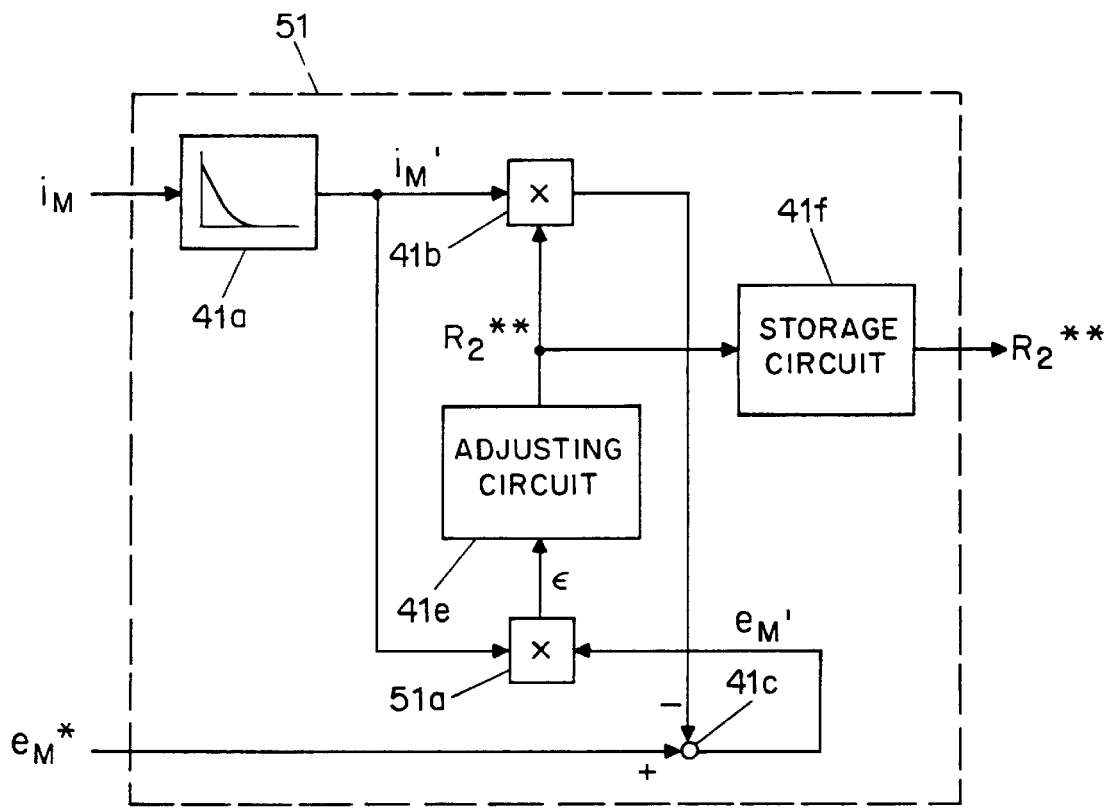
FIG. 16 is a circuit diagram of the secondary resistance value generating device used in the variable speed controllers shown in FIGS. 2 and 5.

FIG. 16 is a circuit diagram of the secondary resistance value generating device 51 used in the variable speed controllers shown in FIGS. 2 and 5. In FIG. 16, like constituent devices with those of FIG. 14 are designated by the like reference numerals.

The actual M-axis current value $i_M$ and operated induced M-axis voltage value $e_M{}^*$ are inputted to the secondary resistance value generating device 51. The secondary resistance value generating device 51 includes a high-pass filter 41a, a multiplier 41b, an adder 41c, a multiplier 51a, an adjusting circuit 41e and a storage circuit 41f. The multiplier 41b multiplies a value $i_M'$, obtained by making the actual M-axis current value $i_M$ pass the high-pass filter 41a, and the secondary resistance $R_2{}^{**}$. The adder 41c calculates a value $e_M'$ by subtracting the output of the multiplier 41b from the operated induced M-axis voltage value $e_M{}^*$. The multiplier 51a obtains an error signal $\epsilon$ by multiplying the value $e_M'$ and the foregoing value $i_M'$. The storage circuit 41f stores the value, obtained in the adjusting circuit 41e by the integral or proportional plus integral operation of the error signal $\epsilon$, as a new secondary resistance $R_2{}^{}$. The storage circuit 41f outputs the new secondary resistance $R_2{}^{}$ every time when the new secondary resistance $R_2{}^{**}$ is obtained.

The secondary resistance value generating device 51 obtains the error signal $\epsilon$ by multiplying $e_M'$ explained with reference to equation (5) and $\Delta i_M$ or a signal same in sign with $\Delta i_M$ such as $i_M'$ in the multiplier 51a and makes the secondary resistance $R_2{}^{**}$ converge to the secondary resistance $R_2$ in the adjusting circuit 41e to which the error signal $\epsilon$ is inputted.

Figure 17:
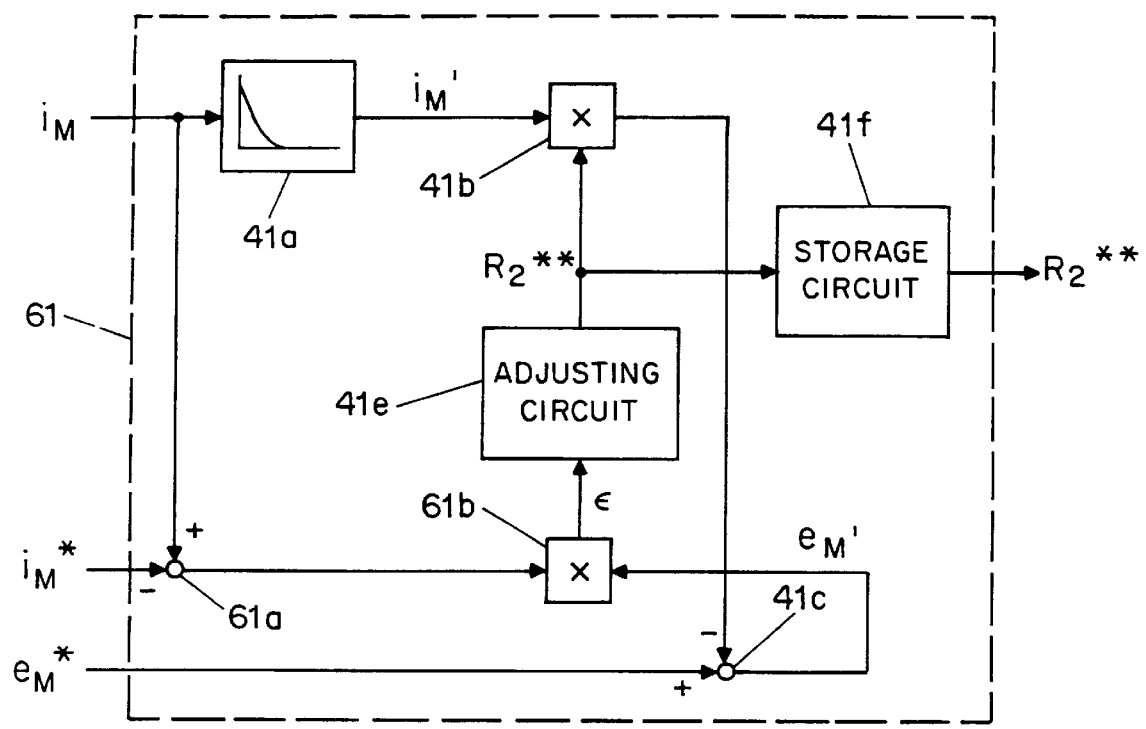
FIG. 17 is a circuit diagram of the secondary resistance value generating device used in the variable speed controllers shown in FIGS. 3 and 6.

FIG. 17 is a circuit diagram of the secondary resistance value generating device 61 used in the variable speed controllers shown in FIGS. 3 and 6. In FIG. 17, like constituent devices with those of FIG. 14 are designated by the like reference numerals.

The reference M-axis current value $i_M{}^*$, actual M-axis current value $i_M$ and operated induced M-axis voltage value $e_M{}^*$ are inputted to the secondary resistance value generating device 61. The secondary resistance value generating device 61 includes a high-pass filter 41a, a multiplier 41b, an adder 41c, another adder 61a, a multiplier 61b, an adjusting circuit 41e and a storage circuit 41f. The multiplier 41b multiplies a value $i_M'$, obtained by making the actual M-axis current value $i_M$ pass the high-pass filter 41a, and the secondary resistance $R_2^{**}$. The adder 41c calculates a value $e_M'$ by subtracting the output of the multiplier 41b from the operated induced M-axis voltage value $e_M^*$. The adder 61a subtracts the reference M-axis current value $i_M^*$ from the actual M-axis current value $i_M$. The multiplier 61b obtains an error signal $\epsilon$ by multiplying the value $e_M'$ and the output of the adder 61a. The storage circuit 41f stores the value, obtained in the adjusting circuit 41e by the integral or proportional plus integral operation of the error signal $\epsilon$, as a new secondary resistance $R_2^{}$. The storage circuit 41f outputs the new secondary resistance $R_2^{}$ every time when the new secondary resistance $R_2^{**}$ is obtained.

The secondary resistance value generating device 61 obtains the error signal $\epsilon$ by multiplying $e_M'$ explained with reference to equation (5) and $\Delta i_M$ or a signal same in sign with $\Delta i_M$ such as the output of the adder 61a in the multiplier 61b and makes the secondary resistance $R_2^{**}$ converge to the secondary resistance $R_2$ in the adjusting circuit 41e to which the error signal $\epsilon$ is inputted.

The secondary resistance value generating devices of FIGS. 4 through 6 execute the so-called speed-sensor-less trans-vector control. It is known to those skilled in the art that it is necessary to make converge the secondary resistance $R_2^{**}$, outputted from the secondary resistance value generating device, to the secondary resistance $R_2$ of the induction motor 2 for generating the reference T-axis voltage value $v_T^*$ and reference phase angle $\theta^*$ which the reference value generator 71 feeds.

In the foregoing secondary resistance value generating devices 41, 51 and 61, the time constant ($1/2\pi f_c$), corresponding to the cutoff frequency $f_c$ of the high-pass filter 41a, is set to be equal to the secondary time constant $\tau_2$. The time constant ($1/2\pi f_c$) may be automatically adjusted to be equal to the secondary time constant $\tau_2$ as will be explained below.

Figure 18:
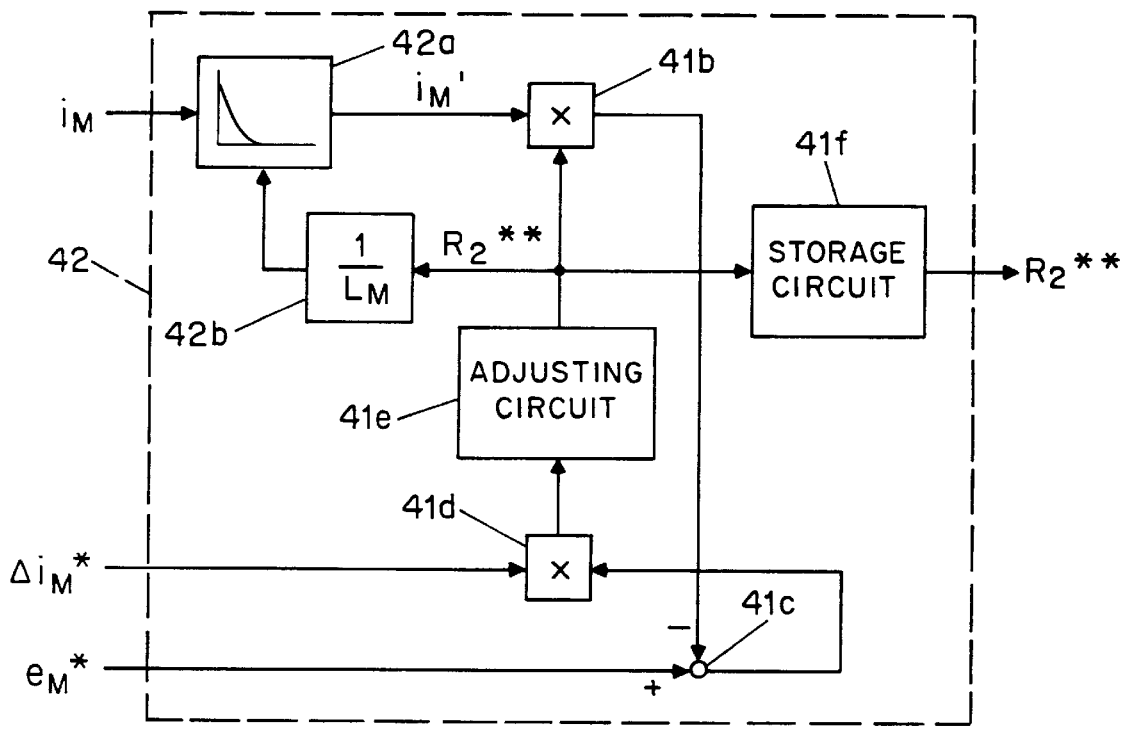
FIG. 18 is a circuit diagram of another secondary resistance value generating device used in place of the secondary resistance value generating device of FIG. 14.

FIG. 18 is a circuit diagram of another secondary resistance value generating device 42 used in place of the secondary resistance value generating device 41 of FIG. 14.

Referring now to FIG. 18, the value obtained by multiplying the secondary resistance $R_2^{**}$ and the reciprocal of the set value of the exciting inductance $L_M$ is equalized to the reciprocal of the secondary time constant ($1/\tau_2$) by the constant gain circuit 42b of the secondary resistance value generating device 42. The secondary resistance value generating device 42 adjusts, based on this $\tau_2$, the time constant ($1/2\pi f_c = \tau_2^*$) corresponding to the cutoff frequency $f_c$ of a high-pass filter 42a.

The output $i_M'$ of the high-pass filter 42a is expressed by the following equation (8).

$$i_M' = i_M \exp(-t/\pi_2^*) \qquad (8)$$

Figure 19:
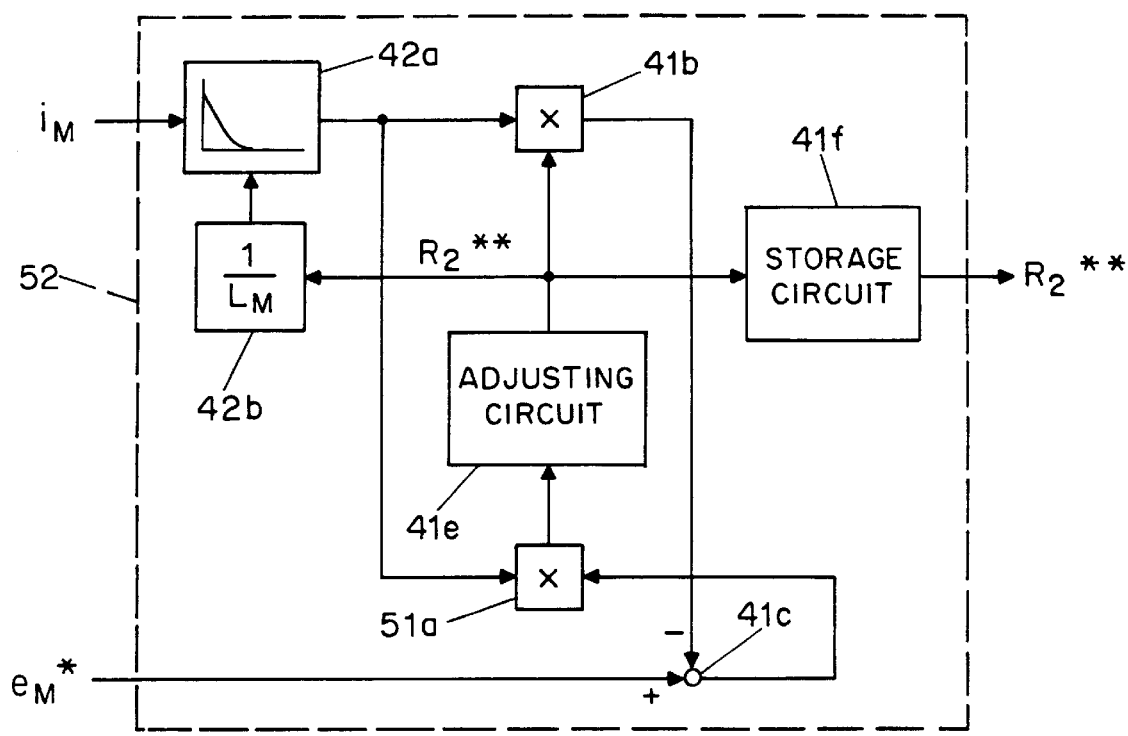
FIG. 19 is a circuit diagram of another secondary resistance value generating device used in place of the secondary resistance value generating device of FIG. 16.

FIG. 19 is a circuit diagram of another secondary resistance value generating device 52 used in place of the secondary resistance value generating device 51 of FIG. 16.

The secondary resistance value generating device 52 operates in the similar manner as the secondary resistance value generating device 51 except that the secondary resistance value generating device 52 sets the cutoff frequency $f_c$ of the high-pass filter 42a based on the foregoing $\tau_2$ using the high-pass filter 42a and the constant gain circuit 42b.

Figure 20:
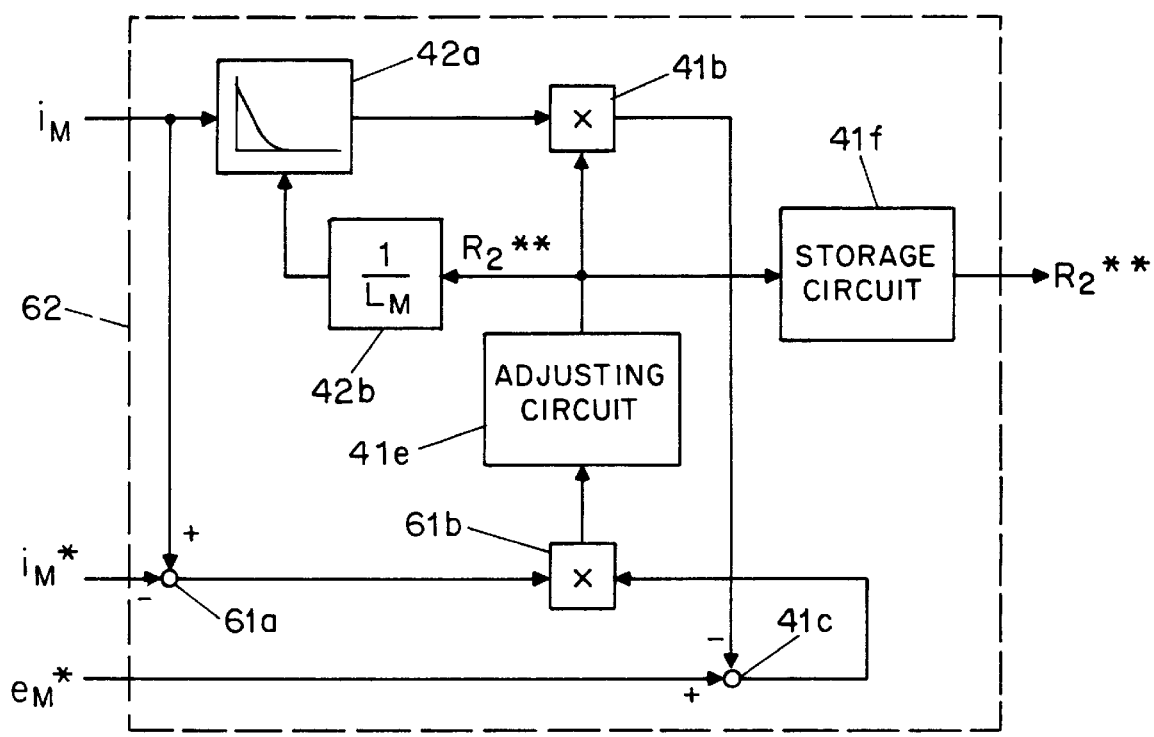
FIG. 20 is a circuit diagram of another secondary resistance value generating device used in place of the secondary resistance value generating device of FIG. 17.

FIG. 20 is a circuit diagram of another secondary resistance value generating device 62 used in place of the secondary resistance value generating device 61 of FIG. 17.

The secondary resistance value generating device 62 operates in the similar manner as the secondary resistance value generating device 61 except that the secondary resistance value generating device 62 sets the cutoff frequency $f_c$ of the high-pass filter 42a based on the foregoing $\tau_2$ using the high-pass filter 42a and the constant gain circuit 42b.

Figure 21:
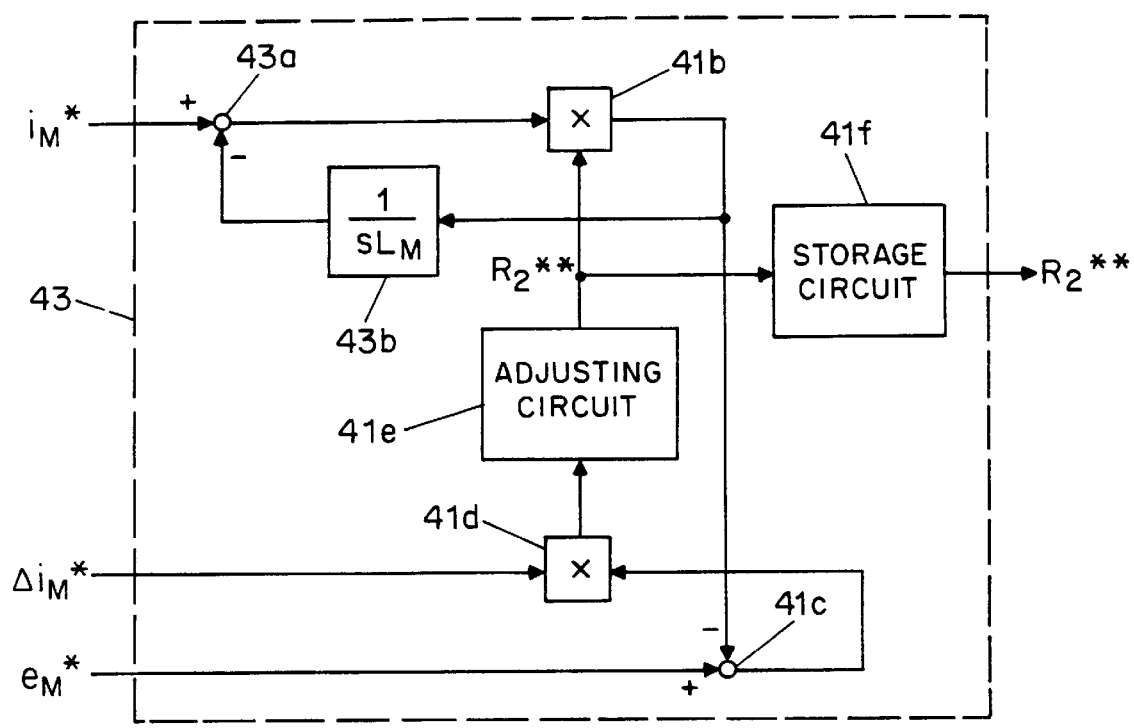
FIG. 21 is a circuit diagram of still another secondary resistance value generating device used in place of the secondary resistance value generating device of FIG. 14 or 18.

FIG. 21 is a circuit diagram of still another secondary resistance value generating device 43 used in place of the secondary resistance value generating device 41 or 42 of FIG. 14 or 18.

The secondary resistance value generating device 43 subtracts the value, obtained by integrating the output ($R_2^{**} X i_M'$) of the multiplier 41b in the integrator 43b with the integral gain of $1/L_M$, from the actual M-axis current value $i_M$ in the adder 43a. The secondary resistance value generating device 43 obtains the function of the high-pass filter 42a for realizing the equation (8) by setting the output of the adder 43a to be $i_M'$.

Figure 22:
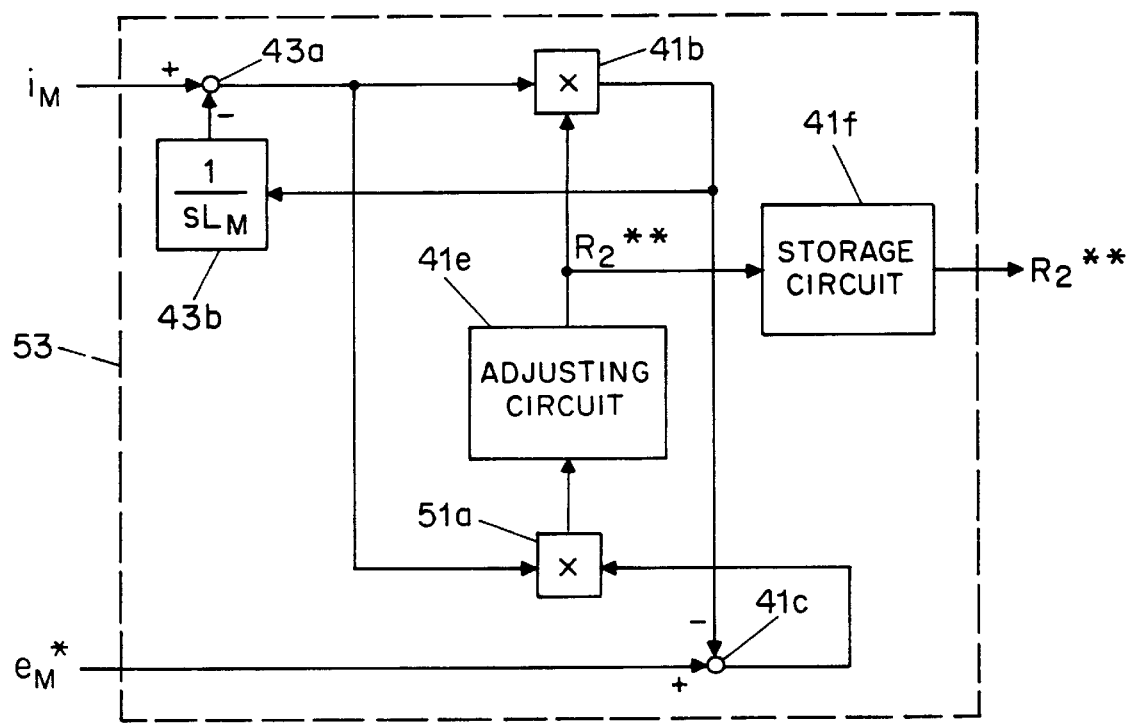
FIG. 22 is a circuit diagram of still another secondary resistance value generating device used in place of the secondary resistance value generating device of FIG. 16 or 19.

FIG. 22 is a circuit diagram of still another secondary resistance value generating device 53 used in place of the secondary resistance value generating device 51 or 52 of FIG. 16 or 19. The secondary resistance value generating device 53 obtains the function of the high-pass filter 42a by the adder 43a and the integrator 43b.

Figure 23:
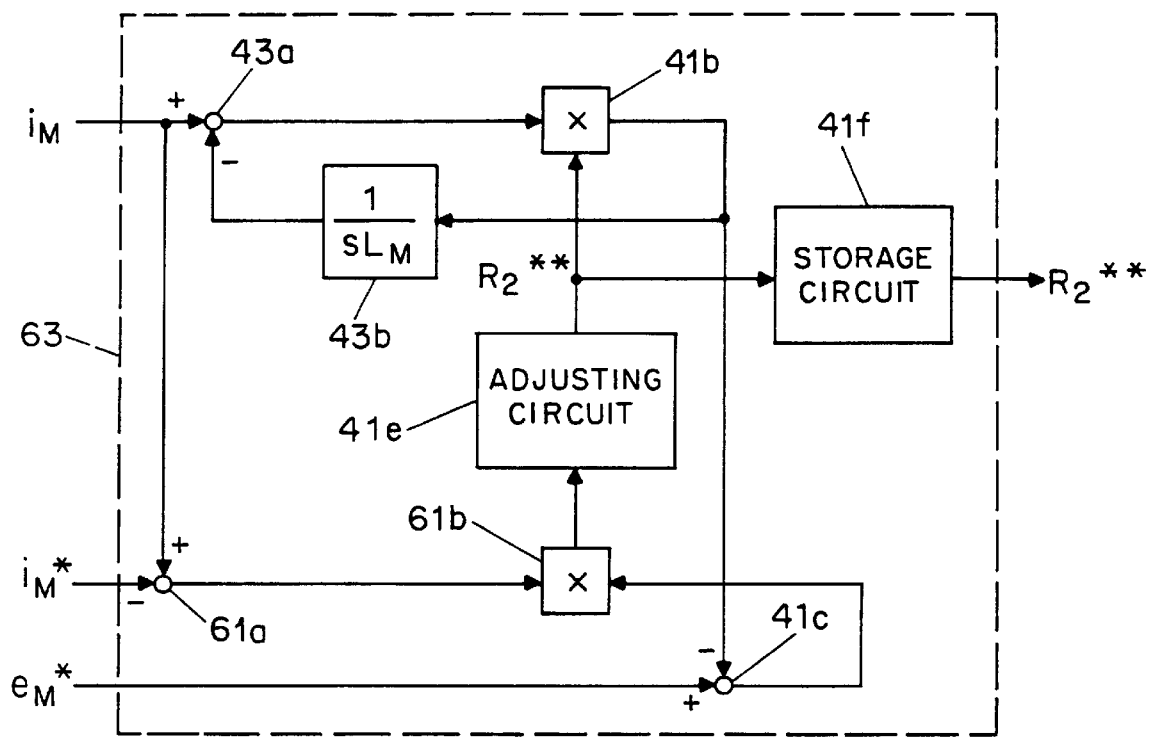
FIG. 23 is a circuit diagram of still another secondary resistance value generating device used in place of the secondary resistance value generating device of FIG. 17 or 20.

FIG. 23 is a circuit diagram of still another secondary resistance value generating device 63 used in place of the secondary resistance value generating device 61 or 62 of FIG. 17 or 20. The secondary resistance value generating device 63 obtains the function of the high-pass filter 42a by the adder 43a and the integrator 43b.

In the following, the secondary resistance value generating devices, which facilitate more accurately obtaining the secondary resistance $R_2^{**}$ by making at least one of the respective input signals for generating the error signal $\epsilon$ pass the high-pass filter to remove the DC component that causes the offset of the input signals, will be explained.

Figure 24:
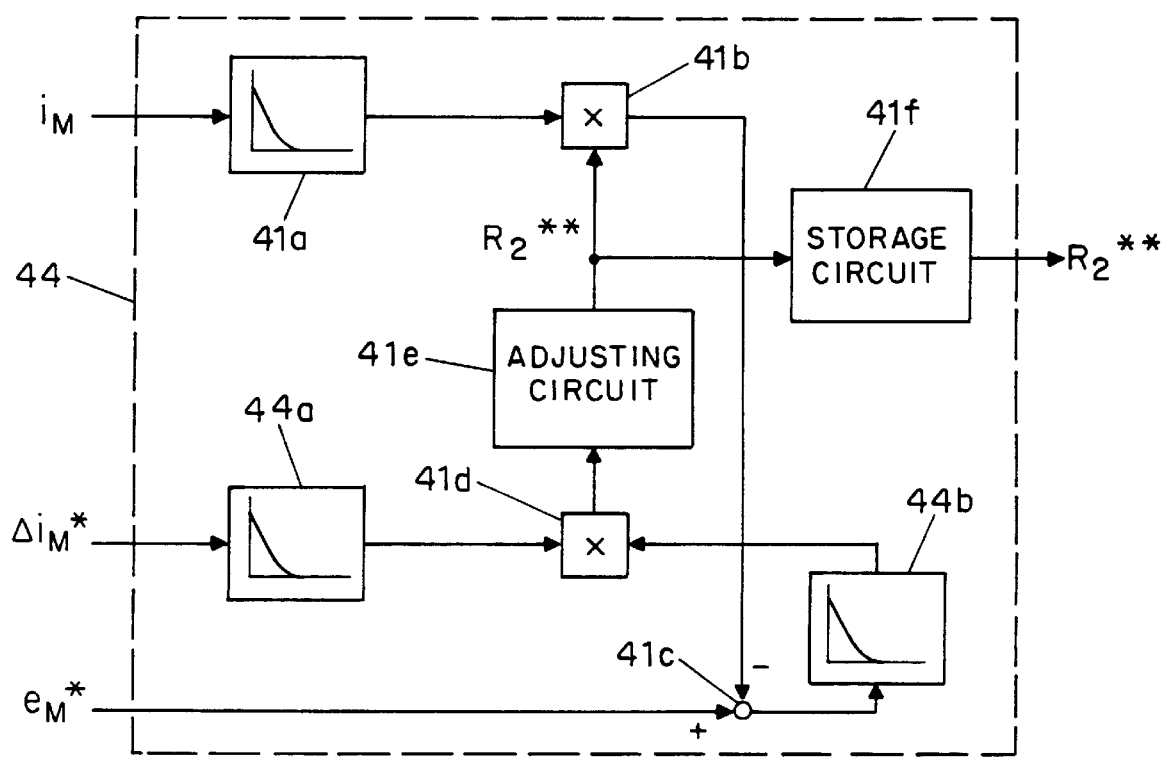
FIG. 24 is a circuit diagram of a further secondary resistance value generating device used in place of the secondary resistance value generating device of FIG. 14.

FIG. 24 is a circuit diagram of a further secondary resistance value generating device 44 used in place of the secondary resistance value generating device 41 of FIG. 14.

Referring now to FIG. 24, high-pass filters 44a and 44b are inserted on the input side of the multiplier 41d to remove the DC components from the signals inputted to the multiplier 41d.

The high-pass filters 44a and 44b may be inserted on the input side of the multiplier 41d of the secondary resistance value generating devices 42 and 43.

Figure 25:
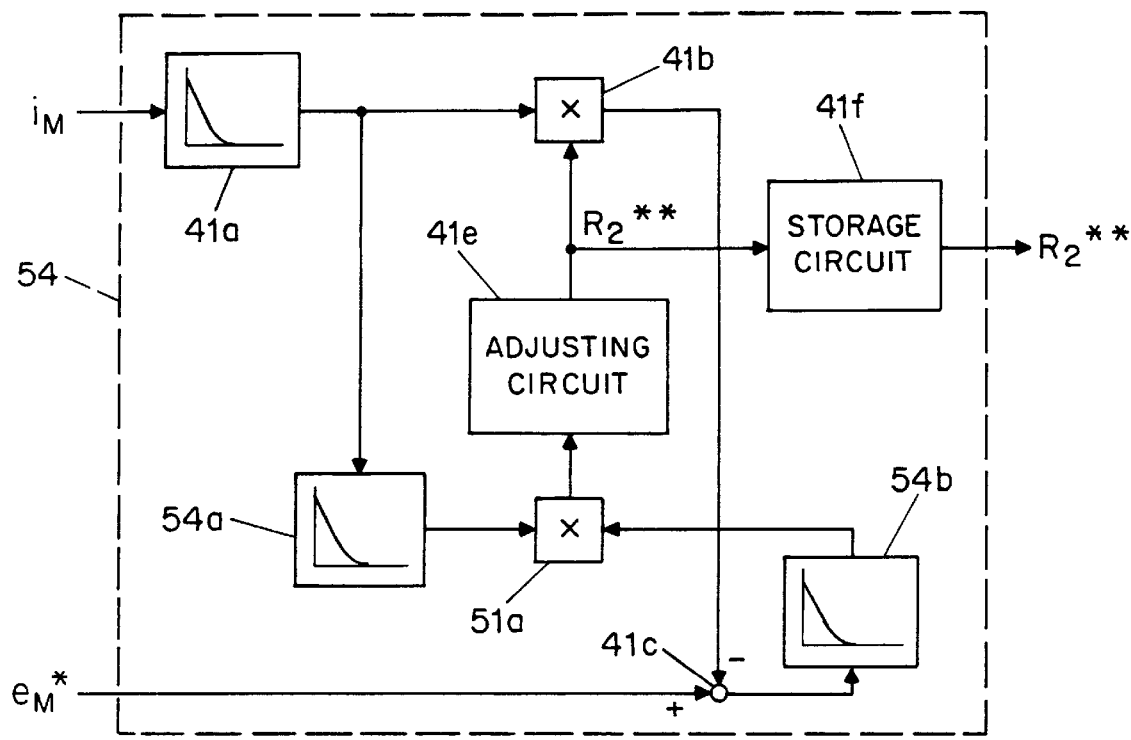
FIG. 25 is a circuit diagram of a further secondary resistance value generating device used in place of the secondary resistance value generating device of FIG. 16.

FIG. 25 is a circuit diagram of a further secondary resistance value generating device 54 used in place of the secondary resistance value generating device 51 of FIG. 16.

Referring now to FIG. 25, high-pass filters 54a and 54b are inserted on the input side of the multiplier 5 la to remove the DC components from the signals inputted to the multiplier 51a.

The high-pass filters 54a and 54b may be inserted on the input side of the multiplier 51a of the secondary resistance value generating devices 52 and 53.

Figure 26:
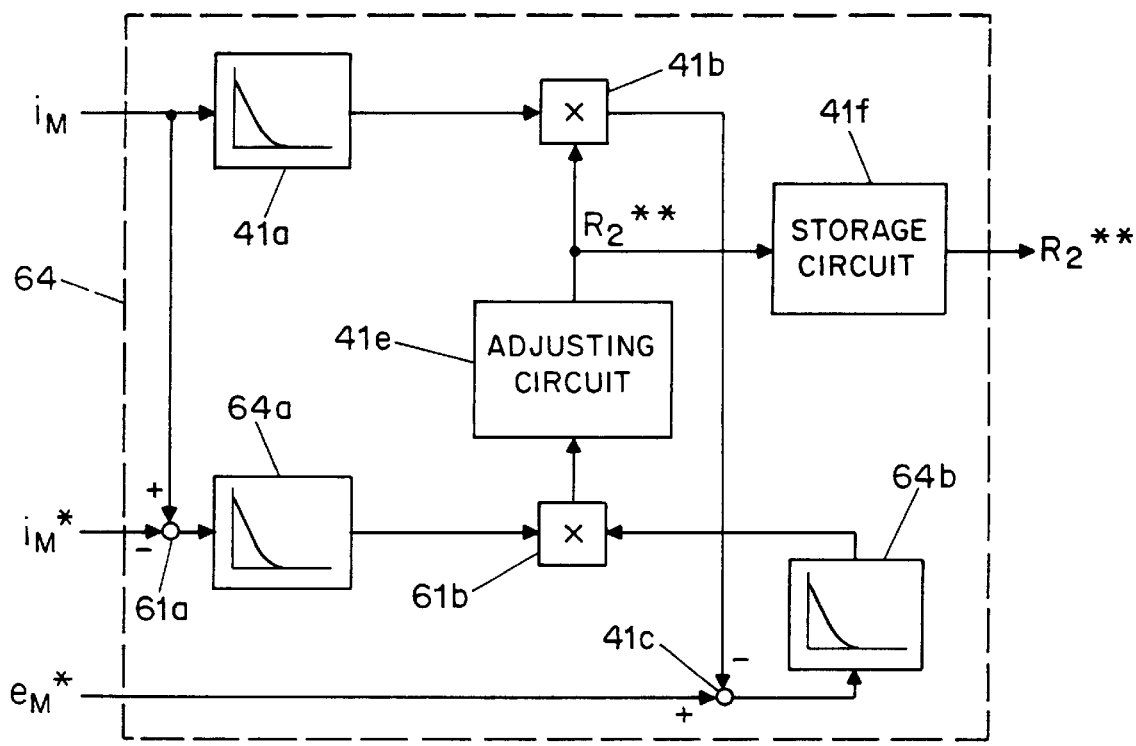
FIG. 26 is a circuit diagram of a further secondary resistance value generating device used in place of the secondary resistance value generating device of FIG. 17.

FIG. 26 is a circuit diagram of a further secondary resistance value generating device 64 used in place of the secondary resistance value generating device 61 of FIG. 17.

Referring now to FIG. 26, high-pass filters 64a and 64b are inserted on the input side of the multiplier 61b to remove the DC components from the signals inputted to the multiplier 61b.

The high-pass filters 64a and 64b may be inserted on the input side of the multipliers 61b of the secondary resistance value generating devices 62 and 63.

The AC signal generator 101 of the variable speed controllers of FIGS. 7 through 12 and the secondary resistance value generating devices 102, 111 and 121 will be explained in detail below.

FIG. 27 is a circuit diagram of the secondary resistance value generating device 102. In FIG. 27, the like constituent elements with those of FIG. 14 are designated by the like reference numerals.

Referring now to FIG. 27, the secondary resistance value generating device 102 is provided with an adjusting circuit 102a for the substitution of the adjusting circuit 41e.

The operation of the secondary resistance value generating device 102 will be explained with reference to FIG. 28 showing the wave forms for explaining the operation of the AC signal generator 101.

The induced voltage operating device 35 operates the foregoing equation (7) to output the actual induced voltage value $e_M^*$, based on the AC signal $\Delta i_M^*$ shown in (A) of FIG. 28 that the AC signal generator 101 outputs. Since the third term on the right side of the equation (7) is a differential term, transitional error may be caused in the actual induced voltage value $e_M^*$ at the rising and tailing of the AC signal $\Delta i_M^*$. To avoid the transitional error, the operation of equation (6) conducted by the adjusting circuit 102a is stopped for the period $T_d$ by the pulse signal shown in FIG. 28(B).

The adjusting circuit 41e for the secondary resistance value generating devices shown in FIGS. 18, 21 and 24 may be replaced by the adjusting circuit 102a.

Figure 29:
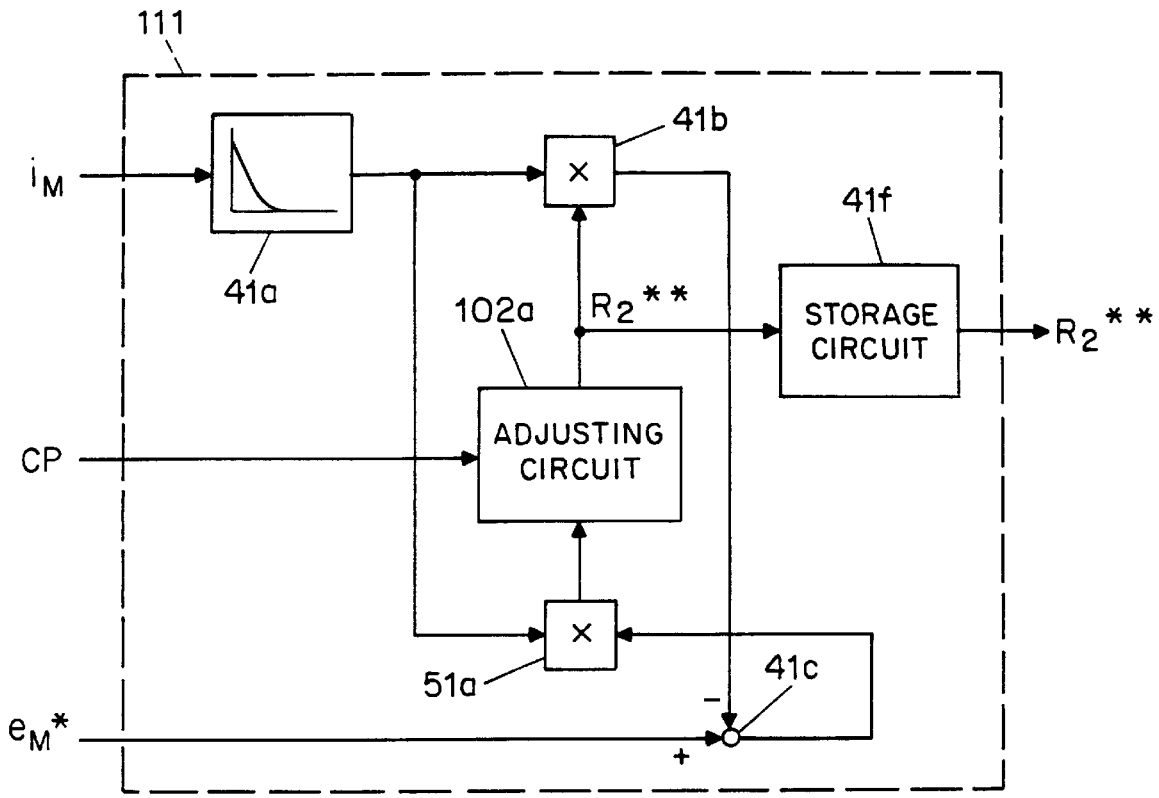
FIG. 29 is a circuit diagram of a still further secondary resistance value generating device used in place of the secondary resistance value generating device of FIG. 16.

FIG. 29 is a circuit diagram of the secondary resistance value generating device 111. In FIG. 29, the like constituent elements with those of FIG. 16 are designated by the like reference numerals.

Referring now to FIG. 29, the secondary resistance value generating device 111 is provided with the adjusting circuit 102a for the substitution of the adjusting circuit 41e.

The adjusting circuit 41e for the secondary resistance value generating devices shown in FIGS. 19, 22 and 25 may be replaced by the adjusting circuit 102a.

Figure 30:
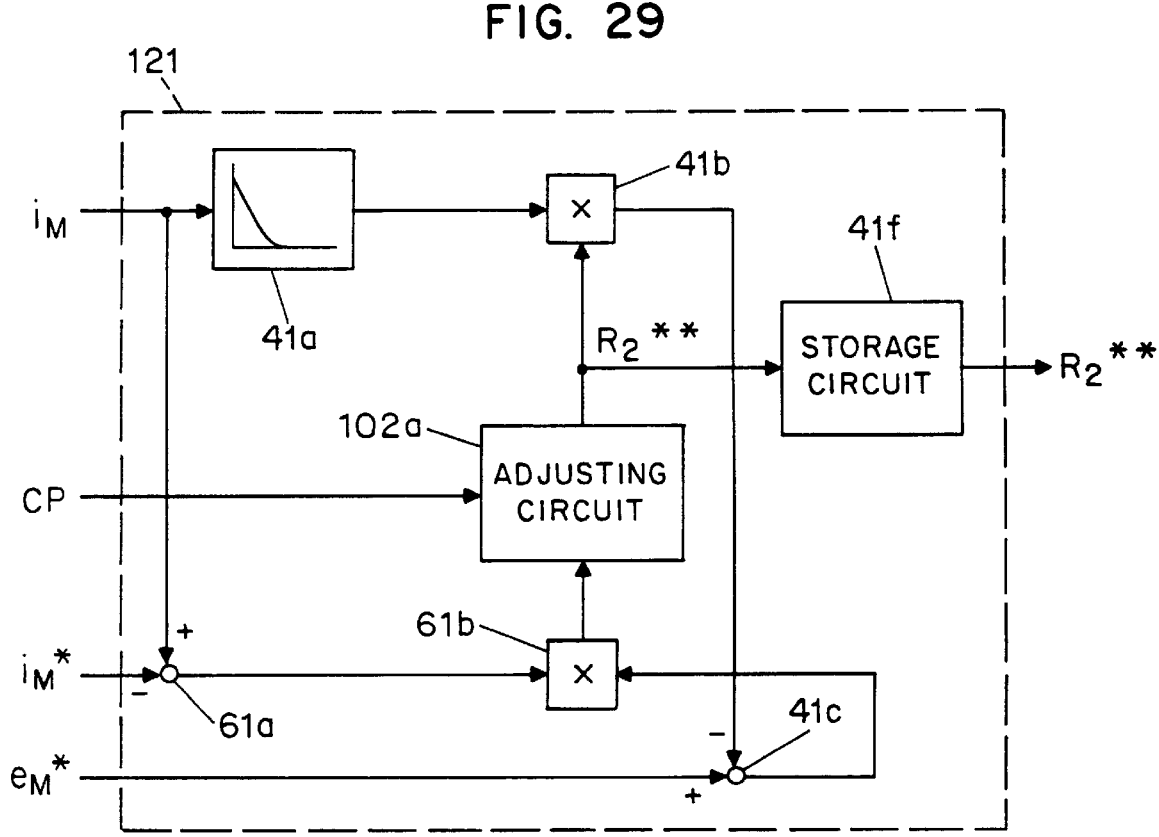
FIG. 30 is a circuit diagram of a still further secondary resistance value generating device used in place of the secondary resistance value generating device of FIG. 17.

FIG. 30 is a circuit diagram of the secondary resistance value generating device 121. In FIG. 30, the like constituent elements with those of FIG. 17 are designated by the like reference numerals.

Referring now to FIG. 30, the secondary resistance value generating device 121 is provided with the adjusting circuit 102a for the substitution of the adjusting circuit 41e. The adjusting circuit 41e for the secondary resistance value generating devices shown in FIGS. 20, 23 and 26 may be replaced by the adjusting circuit 102a.

As explained above, the secondary resistance value generating device of the invention facilitates accurately operating the secondary resistance of the motor by superimposing a changing current based on the AC signal with small amplitude fed from the AC signal generator onto the exciting current for a few seconds during the DC excitation period immediately before rotating the induction motor. The variable speed control of the motor can be conducted appropriately by the trans-vector control based on the thus secondary resistance.

Figure 32:
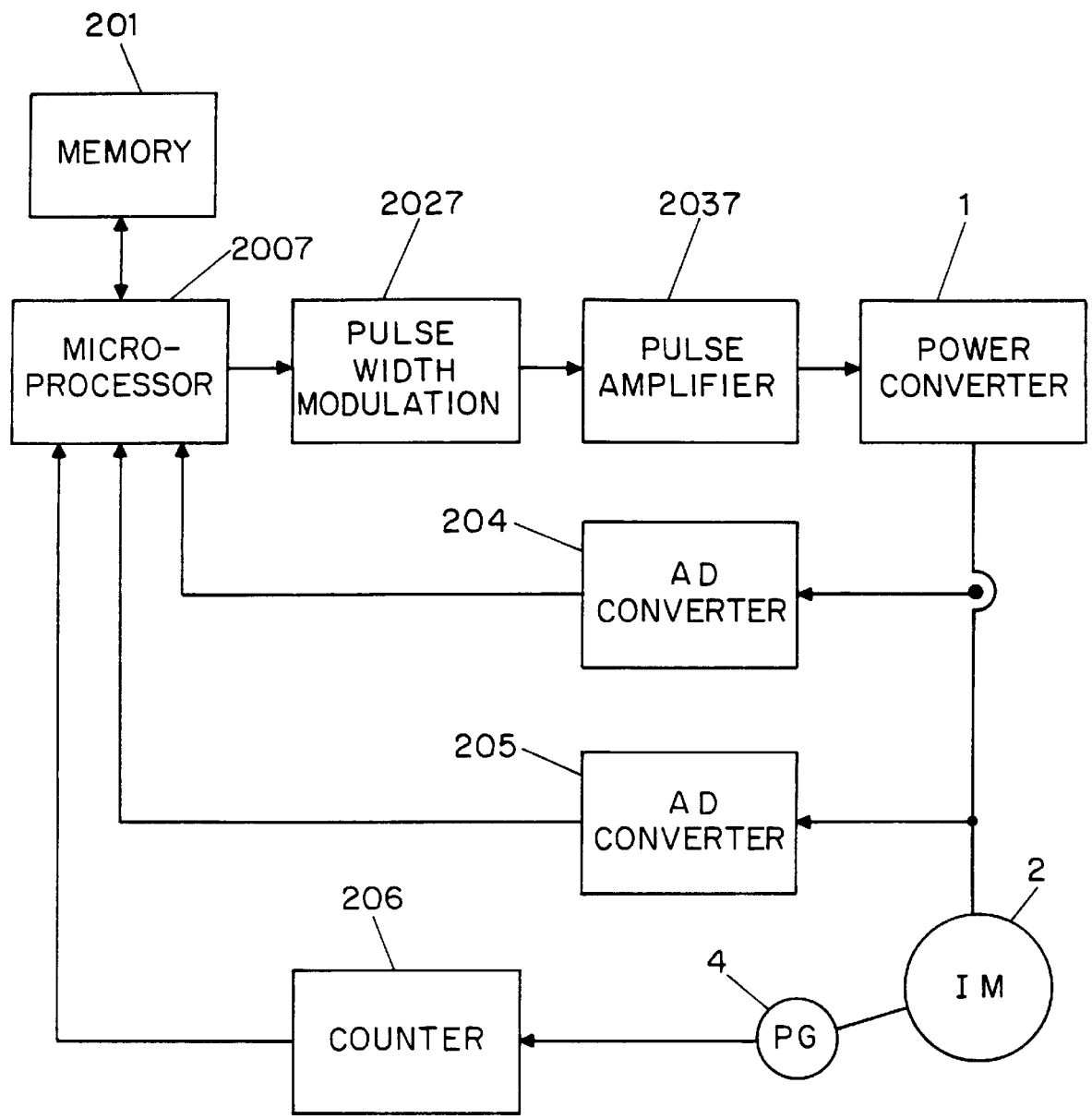
FIG. 32 is a block diagram of an embodiment of a variable speed controller of an AC motor utilizing a microprocessor.
Figure 33:
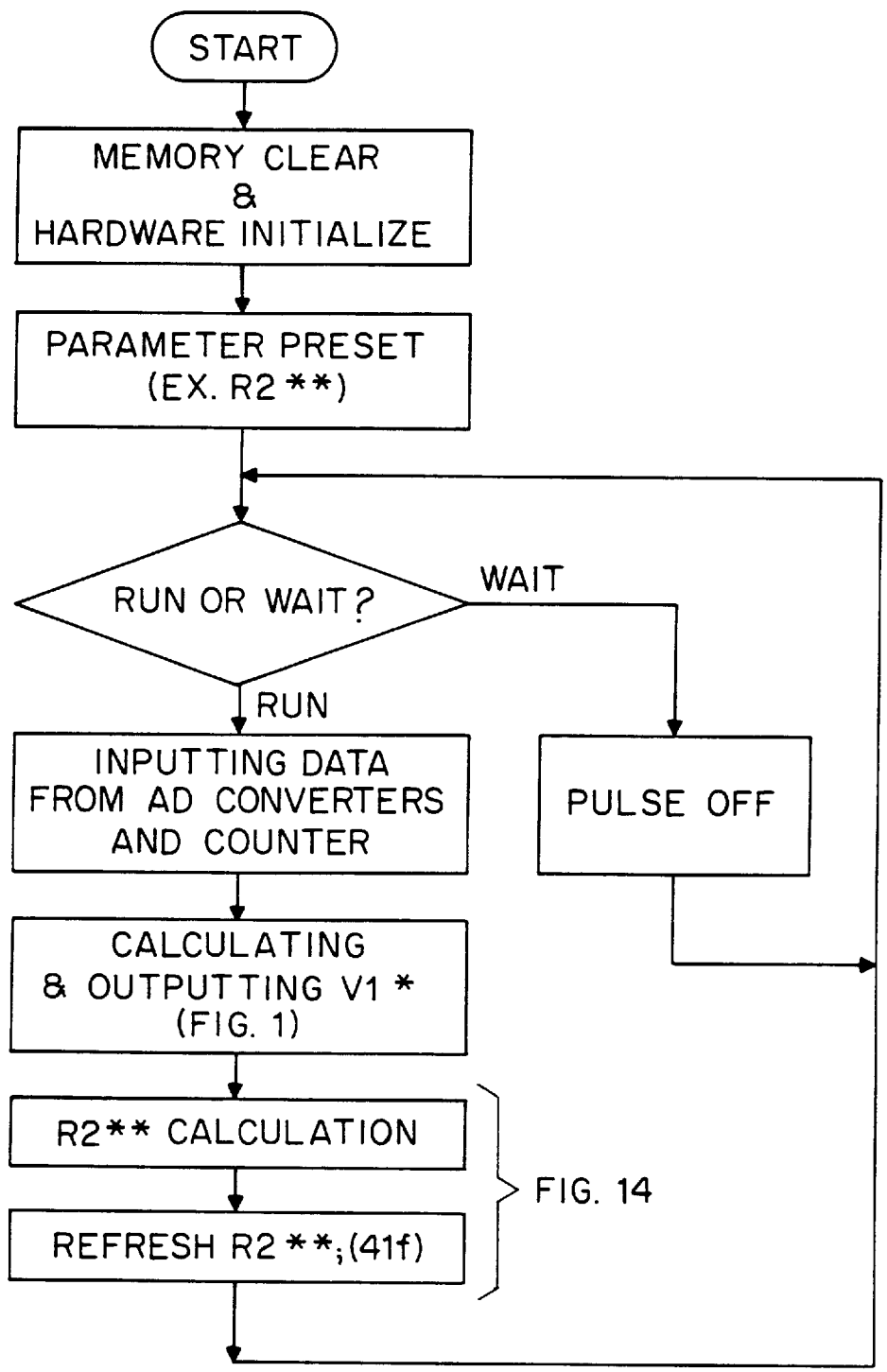
FIG. 33 is a software flow chart for the variable speed controller of FIG. 32.

Finally, FIG. 32 is a block diagram of an embodiment of a variable speed controller of an AC motor utilizing a microprocessor 200. Microprocessor 200, which includes software corresponding to the flow chart of FIG. 33, computes the secondary resistance value $R_2^{**}$ and controls the operation of AC motor 2. Control signals generated by microprocessor 200 are processed by pulse width modulator 202, which in turn generates pulses based on the reference primary voltage value $v_1^*$ for switching of the electric power converter 1. The resulting pulses are amplified by pulse amplifier 203, i.e., the driving gate of electric power converter 1. Data and control parameters are stored in memory unit 201.

As further shown in FIG. 32, analog-to-digital (A/D) converters 204 and 205 are used for converting analog current and voltage signals to corresponding digital input signals for microprocessor 200. Counter 206 generates an input signal for microprocessor 200 representative of the pulses generated by speed detector (pulse generator) 4.

We claim:

1. A variable speed controller of an alternating current ("AC") motor, including detectors for detecting an actual voltage and an actual current of said AC motor fed from an electric power converter, coordinate transformers for resolving said actual voltage to an M-axis voltage component and a T-axis voltage component perpendicular to said M-axis voltage component and for resolving said actual current to an M-axis current component and a T-axis current component perpendicular to said M-axis current component, said variable speed controller executing trans-vector control of said AC motor based on said M-axis components and said T-axis components, said variable speed controller further comprising:

(a) an AC signal generator, said AC signal generator generating an AC signal with small amplitude during a predetermined period immediately before the rotation of said motor;

(b) a reference value generator, said reference value generator generating a reference M-axis current value, a reference speed value and a reference secondary magnetic flux value;

(c) a first adder, said first adder adding said AC signal and said reference M-axis current value;

(d) an M-axis current regulator, said M-axis current regulator executing regulating operation of the difference between the output of said first adder and said M-axis current component;

(e) a speed regulator, said speed regulator executing regulating operation of the difference between said reference speed value and an actual speed value of said AC motor;

(f) a T-axis current regulator, said T-axis current regulator executing regulating operation of the difference between the output of said speed regulator and said T-axis current component;

(g) a coordinate transformer, said coordinate transformer executing coordinate transformation based on the output of said T-axis current regulator, the output of said M-axis current regulator and a reference phase angle value, whereby to generate a gate signal of said electric power converter;

(h) an induced voltage operating device, said induced voltage operating device operating an induced M-axis voltage value of said AC motor based on said M-axis current component and said M-axis voltage component;

(i) a slip frequency operating device, said slip frequency operating device operating a slip frequency of said AC motor based on said reference secondary magnetic flux value, the output of said speed regulator and a secondary resistance value;

(j) a second adder, said second adder adding said slip frequency and said actual speed value;

(k) an integrator, said integrator integrating the output of said second adder, said integrator outputting the result of said integrating as said reference phase angle value;

(l) a secondary resistance value generating device, arranged to adaptively compute said secondary resistance value without experimentally rotating said AC motor, and to store and output said secondary resistance value; and (m) said variable speed controller executing trans-vector control of said AC motor based on said stored secondary resistance value when said AC motor is rotating.

2. The variable speed controller of claim 1, wherein said secondary resistance value generating device inputs said AC signal, said M-axis current component and said operated induced M-axis voltage value when said AC signal is being generated, said secondary resistance value generating device comprising:

(a) a first multiplier for multiplying the value of said M-axis current component through a high-pass filter and said secondary resistance value;

(b) a first subtractor for subtracting the result of said first multiplier from said operated induced M-axis voltage value;

(c) a second multiplier for multiplying the result of said first subtractor and said AC signal, whereby to obtain an error signal, (d) an integrator for executing integral or proportional plus integral operation of said error signal, whereby to obtain the secondary resistance value.

3. The variable speed controller of claim 1, wherein said secondary resistance value generating device inputs said M-axis current component and said operated induced M-axis voltage value when said AC signal is being generated, said secondary resistance value generating device comprising:

(a) a first multiplier for multiplying the value of said M-axis current component through a high-pass filter and said secondary resistance value;

(b) a subtractor for subtracting the result of said multiplying from said operated induced M-axis voltage value;

(c) a second multiplier for multiplying the result of said subtracting and said value of said M-axis current component through said high-pass filter, whereby to obtain an error signal; and (d) an integrator for executing integral or proportional plus integral operation of said error signal, whereby to obtain the secondary resistance value.

4. The variable speed controller of claim 1, wherein said secondary resistance value generating device inputs said reference M-axis current value, said M-axis current component and said operated induced M-axis voltage value when said AC signal is being generated, said secondary resistance value generating device comprising:

(a) a first multiplier for multiplying the value of said M-axis current component through a high-pass filter and said secondary resistance value;

(b) a first subtractor for subtracting the result of said multiplying from said operated induced M-axis voltage value;

(c) a second subtractor for subtracting said reference M-axis current from said actual M-axis current component;

(d) a second multiplier for multiplying the results of said subtractions, whereby to obtain an error signal;

(e) an integrator for executing integral or proportional plus integral operation of said error signal, whereby to obtain the secondary resistance value.

5. A variable speed controller of an alternating current ("AC") motor, including detectors for detecting an actual voltage and an actual current of said AC motor fed from an electric power converter, coordinate transformers for resolving said actual voltage to an M-axis voltage component and a T-axis voltage component perpendicular to said M-axis voltage component and for resolving said actual current to an M-axis current component and a T-axis current component perpendicular to said M-axis current component, said variable speed controller executing trans-vector control of said AC motor based on said M-axis components and said T-axis components, said variable speed controller further comprising:

(a) an AC signal generator, said AC signal generator generating an AC signal with small amplitude during a predetermined period immediately before the rotation said motor;

(b) a reference value generator, said reference value generator generating a reference M-axis current value, a reference T-axis voltage value and a reference phase angle;

(c) an adder, said adder adding said AC signal and said reference M-axis current value;

(d) a current regulator, said current regulator executing regulating operation of the difference between the output of said adder and said M-axis current component;

(e) a coordinate transformer, said coordinate transformer executing coordinate transformation based on the output of said current regulator, said reference T-axis voltage value and said reference phase angle, whereby to obtain a gate signal of said electric power converter;

(f) an induced voltage operating device, said induced voltage operating device operating an induced M-axis voltage value of said AC motor based on said M-axis current component and said M-axis voltage component;

(g) a secondary resistance value generating device, arranged to adaptively compute a secondary resistance value without experimentally rotating said AC motor, and to store and output said secondary resistance value; and (h) said variable speed controller executing trans-vector control of said AC motor based on said stored secondary resistance value when said AC motor is rotating.

6. The variable speed controller of claim 5, wherein said secondary resistance value generating device inputs said AC signal, said M-axis current component and said operated induced M-axis voltage value when said AC signal is being generated, said secondary resistance value generating device comprising:

(a) a first multiplier for multiplying the value of said M-axis current component through a high-pass filter and said secondary resistance value;

(b) a subtractor for subtracting the result of said multiplying from said operated induced M-axis voltage value;

(c) a second multiplier for multiplying the result of said subtracting and said AC signal, whereby to obtain an error signal; and (d) an integrator for executing integral or proportional plus integral operation of said error signal, whereby to obtain the secondary resistance value.

7. The variable speed controller of claim 5, wherein said secondary resistance value generating device inputs said M-axis current component and said operated induced M-axis voltage value when said AC signal is being generated, said secondary resistance value generating device comprising:

(a) a first multiplier for multiplying the value of said M-axis current component through a high-pass filter and said secondary resistance value;

(b) a subtractor for subtracting the result of said multiplying from said operated induced M-axis voltage value;

(c) a second multiplier for multiplying the result of said subtracting and said value of said M-axis current component through said high-pass filter, whereby to obtain an error signal; and (d) an integrator for executing integral or proportional plus integral operation of said error signal, whereby to obtain the secondary resistance value.

8. The variable speed controller of claim 5, wherein said secondary resistance value generating device inputs said reference M-axis current value, said M-axis current component and said operated induced M-axis voltage value when said AC signal is being generated, said secondary resistance value generating device comprising:

(a) a first multiplier for multiplying the value of said M-axis current component through a high-pass filter and said secondary resistance value;

(b) a first subtractor for subtracting the result of said multiplying from said operated induced M-axis voltage value;

(c) a second subtractor for subtracting said reference M-axis current value from said M-axis current component, said secondary resistance value generating device multiplying the results of said subtractions, whereby to obtain an error signal; and (d) an integrator for executing integral or proportional plus integral operation of said error signal whereby to obtain the secondary resistance value.

9. The variable speed controller according to any of claims 2–4 or 6–8, wherein said high-pass filter of said secondary resistance value generating device comprises an adjusting means for adjusting the cutoff frequency thereof at a predetermined value based on said secondary resistance value.

10. The variable speed controller according to any of claims 1–8, wherein said secondary resistance value generating device comprises a high-pass filter or high-pass filters for filtering either one or both of said M-axis current component and said operated induced M-axis current value, whereby to obtain a new M-axis current component or a new operated induced M-axis current value, or whereby to obtain both said new M-axis current component and said operated induced M-axis current value, and said secondary resistance value generating device operates said secondary resistance value based on said new M-axis current component or both said new M-axis current component and said operated induced M-axis current value.

11. The variable speed controller according to any of claims 1–8, wherein said secondary resistance value generating device comprises a high-pass filter or high-pass filters for filtering either one or both of said M-axis current component and said operated induced M-axis current value, whereby to obtain a new M-axis current component or a new operated induced M-axis current value, or whereby to obtain both said new M-axis current component and said operated induced M-axis current value, and said secondary resistance value generating device operates said secondary resistance value based on both said new M-axis current component and said operated induced M-axis current value.

* * * * *

UNITED STATES PATENT AND TRADEMARK OFFICE
CERTIFICATE OF CORRECTION

PATENT NO. : 5,859,521

DATED : January 12, 1999

INVENTOR(S) : Tajima et al.

It is certified that error appears in the above-identified patent and that said Letters Patent is hereby corrected as shown below:

Title Page of Patent, Column 2, [57] Abstract: "a AC" should read -- an AC --;

Column 19, line 21, "(d)" should read -- ¶(d) --;

Column 13, equation (4), "$e_M' = e_M{}^* - R_2{}^{**}) \exp(-t/\tau_2) i_M$" should read -- $e_M' = e_M{}^* - (R_2{}^{**}) \exp(-t/\tau_2) i_M$ --

Column 13, equation (5), "$e_M' = R_2 - R_2{}^{}) \exp(-t/\tau_2) i_M$" should read -- $e_M' = (R_2 - R_2{}^{}) \exp(-t/\tau_2) i_M$ --.

Signed and Sealed this

Twentieth Day of June, 2000

*Attest:*

*Attesting Officer*

Q. TODD DICKINSON

*Director of Patents and Trademarks*